US009802661B1

(12) United States Patent
Kentley-Klay

(10) Patent No.: US 9,802,661 B1
(45) Date of Patent: Oct. 31, 2017

(54) QUADRANT CONFIGURATION OF ROBOTIC VEHICLES

(71) Applicant: Zoox, Inc., Menlo Park, CA (US)

(72) Inventor: Timothy David Kentley-Klay, Stanford, CA (US)

(73) Assignee: Zoox, Inc., Menlo Park, CA (US)

( * ) Notice: Subject to any disclaimer, the term of this patent is extended or adjusted under 35 U.S.C. 154(b) by 0 days.

(21) Appl. No.: 15/338,002

(22) Filed: Oct. 28, 2016

Related U.S. Application Data

(63) Continuation of application No. 14/932,958, filed on Nov. 4, 2015, now Pat. No. 9,494,940.

(51) Int. Cl.
*G01C 22/00* (2006.01)
*G05D 1/00* (2006.01)
(Continued)

(52) U.S. Cl.
CPC ............. *B62D 63/025* (2013.01); *B60Q 1/46* (2013.01); *B60Q 5/006* (2013.01); *B60Q 9/008* (2013.01);
(Continued)

(58) Field of Classification Search
CPC ...... B62D 63/025; B62D 21/15; B60Q 9/008; B60Q 5/006; B60Q 1/46; G05D 1/0246;
(Continued)

(56) References Cited

U.S. PATENT DOCUMENTS

| 5,558,370 A | 9/1996 | Behr |
| 5,959,552 A | 9/1999 | Cho |

(Continued)

FOREIGN PATENT DOCUMENTS

| EP | 2626760 | 8/2013 |
| WO | WO9307016 A1 | 10/1992 |

(Continued)

OTHER PUBLICATIONS

Office Action for U.S. Appl. No. 14/932,952, dated Jun. 24, 2016, Kentley et al., "Resilient Safety System for a Robotic Vehicle", 11 pages.

(Continued)

*Primary Examiner* — Jaime Figueroa
(74) *Attorney, Agent, or Firm* — Lee & Hayes, PLLC

(57) ABSTRACT

Systems, apparatus and methods to implement sectional design (e.g., in quadrants) of an autonomous vehicle may include modular construction techniques to assemble an autonomous vehicle from multiple structural sections. The multiple structural sections may be configured to implement radial and bilateral symmetry. A structural section based configuration may include a power supply configuration (e.g., using rechargeable batteries) including a double-backed power supply system. The power supply system may include a kill switch disposed on a power supply (e.g., at an end of a rechargeable battery). The kill switch may be configured to disable the power supply system in the event of an emergency or after a collision, for example. The radial and bilateral symmetry may provide for bi-directional driving operations of the autonomous vehicle as the vehicle may not have a designated front end or a back end.

29 Claims, 24 Drawing Sheets

(51) Int. Cl.
  *B62D 63/02* (2006.01)
  *G05D 1/02* (2006.01)
  *B60R 13/08* (2006.01)
  *B60Q 1/46* (2006.01)
  *B60Q 5/00* (2006.01)
  *B62D 21/15* (2006.01)
  *B60Q 9/00* (2006.01)

(52) U.S. Cl.
  CPC .......... *B60R 13/0815* (2013.01); *B62D 21/15* (2013.01); *G05D 1/0088* (2013.01); *G05D 1/0246* (2013.01); *G05D 1/0255* (2013.01)

(58) Field of Classification Search
  CPC .. G05D 1/0255; G05D 1/0088; G05D 1/0272; G05D 1/027; G05D 1/0278; G05D 2201/0216; B60R 13/0815
  USPC ...................................................... 701/1, 23
  See application file for complete search history.

(56) References Cited

U.S. PATENT DOCUMENTS

| | | | |
|---|---|---|---|
| 6,301,542 B1 | 10/2001 | Kirchberger et al. | |
| 6,374,168 B1 | 4/2002 | Fujii | |
| 6,728,616 B1 | 4/2004 | Tabe | |
| 7,426,429 B2 | 9/2008 | Tabe | |
| 8,123,642 B2 | 2/2012 | Ishikawa et al. | |
| 8,126,642 B2 | 2/2012 | Trepagnier et al. | |
| 8,392,064 B2 | 3/2013 | Thrun et al. | |
| 8,434,919 B2 | 5/2013 | Schofield | |
| 8,550,196 B2 | 10/2013 | Ross | |
| 8,880,272 B1 | 11/2014 | Ferguson et al. | |
| 8,977,007 B1 | 3/2015 | Ferguson et al. | |
| D743,978 S | 11/2015 | Amin | |
| 9,194,168 B1 | 11/2015 | Lu et al. | |
| 9,201,426 B1 | 12/2015 | Bonawitz | |
| 9,213,934 B1 | 12/2015 | Versteeg et al. | |
| 9,384,443 B2 | 7/2016 | Passot et al. | |
| 9,395,727 B1 | 7/2016 | Smith et al. | |
| 2004/0017073 A1 | 1/2004 | Pavlov et al. | |
| 2004/0068354 A1 | 4/2004 | Tabe | |
| 2005/0216181 A1 | 9/2005 | Estkowski et al. | |
| 2006/0064202 A1 | 3/2006 | Gutmann et al. | |
| 2006/0089763 A1 | 4/2006 | Barrett et al. | |
| 2006/0175116 A1 | 8/2006 | Friedman et al. | |
| 2006/0207820 A1 | 9/2006 | Joshi et al. | |
| 2007/0096447 A1 | 5/2007 | Tabe | |
| 2007/0246927 A1 | 10/2007 | Okada | |
| 2008/0033645 A1 | 2/2008 | Levinson et al. | |
| 2008/0084283 A1 | 4/2008 | Kalik | |
| 2008/0097699 A1 | 4/2008 | Ono | |
| 2008/0320421 A1 | 12/2008 | Demaris et al. | |
| 2009/0029826 A1 | 1/2009 | Eguchi et al. | |
| 2009/0036090 A1 | 2/2009 | Cho et al. | |
| 2009/0276149 A1 | 11/2009 | Kauffman et al. | |
| 2010/0045482 A1 | 2/2010 | Strauss | |
| 2011/0130111 A1 | 6/2011 | Crandall et al. | |
| 2011/0288684 A1 | 11/2011 | Farlow et al. | |
| 2012/0083960 A1 | 4/2012 | Zhu et al. | |
| 2012/0193153 A1 | 8/2012 | Wellborn et al. | |
| 2012/0256448 A1* | 10/2012 | Yasui | B62D 21/152 296/209 |
| 2013/0006451 A1 | 1/2013 | Cooper et al. | |
| 2013/0054133 A1 | 2/2013 | Lewis et al. | |
| 2013/0060412 A1 | 3/2013 | Nakagawara et al. | |
| 2013/0144476 A1 | 6/2013 | Pinto et al. | |
| 2013/0246301 A1 | 9/2013 | Radhakrishnan et al. | |
| 2013/0268138 A1 | 10/2013 | Moughler et al. | |
| 2014/0032012 A1 | 1/2014 | Joshi et al. | |
| 2014/0032049 A1 | 1/2014 | Moshchuk et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0142830 A1 | 5/2014 | Bernzen et al. | |
| 2014/0185880 A1 | 7/2014 | Fairfield et al. | |
| 2014/0188343 A1 | 7/2014 | Yoshimura et al. | |
| 2014/0188347 A1 | 7/2014 | Tabe | |
| 2014/0214255 A1 | 7/2014 | Dolgov et al. | |
| 2014/0214260 A1 | 7/2014 | Eckert et al. | |
| 2014/0244151 A1 | 8/2014 | Matsubara et al. | |
| 2014/0257661 A1 | 9/2014 | Schulman et al. | |
| 2014/0303827 A1 | 10/2014 | Dolgov et al. | |
| 2014/0309833 A1 | 10/2014 | Ferguson et al. | |
| 2014/0333468 A1 | 11/2014 | Zhu et al. | |
| 2014/0336935 A1 | 11/2014 | Zhu et al. | |
| 2014/0358353 A1 | 12/2014 | Ibanez-Guzman et al. | |
| 2014/0358427 A1 | 12/2014 | Fuhrman | |
| 2015/0025708 A1 | 1/2015 | Anderson | |
| 2015/0039157 A1 | 2/2015 | Wolfe et al. | |
| 2015/0039167 A1 | 2/2015 | Ideshio et al. | |
| 2015/0039391 A1 | 2/2015 | Hershkovitz et al. | |
| 2015/0057871 A1 | 2/2015 | Ono et al. | |
| 2015/0091374 A1 | 4/2015 | Lenius et al. | |
| 2015/0094850 A1 | 4/2015 | Passot et al. | |
| 2015/0127224 A1 | 5/2015 | Tabe | |
| 2015/0127239 A1 | 5/2015 | Breed et al. | |
| 2015/0149088 A1 | 5/2015 | Allard et al. | |
| 2015/0160024 A1 | 6/2015 | Fowe | |
| 2015/0248131 A1 | 9/2015 | Fairfield et al. | |
| 2015/0254986 A1 | 9/2015 | Fairfield et al. | |
| 2015/0258928 A1 | 9/2015 | Goto et al. | |
| 2015/0268665 A1 | 9/2015 | Ludwick et al. | |
| 2015/0271290 A1 | 9/2015 | Tao et al. | |
| 2015/0292894 A1 | 10/2015 | Goddard et al. | |
| 2015/0298636 A1 | 10/2015 | Furst | |
| 2015/0336502 A1 | 11/2015 | Hillis et al. | |
| 2015/0336524 A1 | 11/2015 | Larner et al. | |
| 2015/0338226 A1 | 11/2015 | Mason et al. | |
| 2015/0338852 A1 | 11/2015 | Ramanujam | |
| 2015/0339928 A1 | 11/2015 | Ramanujam | |
| 2015/0346727 A1 | 12/2015 | Ramanujam | |
| 2015/0348221 A1 | 12/2015 | Pedersen et al. | |
| 2015/0356368 A1 | 12/2015 | Liu et al. | |
| 2015/0359032 A1 | 12/2015 | Menard et al. | |
| 2015/0370251 A1 | 12/2015 | Siegel et al. | |
| 2015/0375764 A1 | 12/2015 | Rajendran et al. | |
| 2016/0016315 A1 | 1/2016 | Kuffner, Jr. et al. | |
| 2016/0071278 A1 | 3/2016 | Leonard et al. | |
| 2016/0107703 A1* | 4/2016 | Briceno | B62D 25/088 296/187.1 |
| 2016/0159402 A1* | 6/2016 | Nakaya | B62D 25/20 296/193.02 |
| 2016/0159407 A1* | 6/2016 | Holmstrom | B62D 27/023 296/187.1 |
| 2016/0165775 P1 | 6/2016 | Maillard et al. | |
| 2016/0165786 P1 | 6/2016 | Giesen | |
| 2016/0189544 A1 | 6/2016 | Ricci | |
| 2016/0209220 A1 | 7/2016 | Laetz | |
| 2016/0247106 A1 | 8/2016 | Dalloro et al. | |
| 2016/0247109 A1 | 8/2016 | Scicluna et al. | |
| 2017/0120753 A1 | 5/2017 | Kentley | |

FOREIGN PATENT DOCUMENTS

| | | |
|---|---|---|
| WO | 2009151781 | 12/2009 |
| WO | WO2013087527 A1 | 6/2013 |
| WO | WO2014129944 | 8/2014 |

OTHER PUBLICATIONS

Office action for U.S. Appl. No. 14/932,963, dated Aug. 15, 2016, Levinson et al., "Adaptive Mapping to Navigate Autonomous Vehicles Responsive to Physical Environment Changes", 15 pages.

Office Action for U.S. Appl. No. 14/933,602, dated Nov. 5, 2015, Levinson et al., "Machine-Learning Systems and Techniques to Optimize Teleoperation and/or Planner Decisions", 11 pages.

Office action for U.S. Appl. No. 14/756,992, dated Aug. 25, 2016, Levinson et al., "Adaptive autonomous vehicle planner logic", 9 pages.

(56) References Cited

OTHER PUBLICATIONS

Office action for U.S. Appl. No. 14/933,469, dated Aug. 30, 2016, Kentley et al., "Software Application to Request and Control an Autonomous Vehicle Service", 11 pages.
Office action for U.S. Appl. No. 14/932,959, dated Aug. 5, 2016, Kentley et al., "Autonomous Vehicle Fleet Service and System", 16 pages.
Keivan, et al., "Online Slam With Any-Time Self-Calibration and Automatic Change Detection"; IEEE International Conference on Robotics and Automation (ICRA); (2014). (8 pages).
Teichman, et al., "Online, Semi-Supervised Learning for Long-Term Interaction With Object Recognition Systems", RSS Workshop on Long-Term Operation of Autonomous Robotic D Systems in Changing Environments (2012). (62 pages).
Teichman, et al., "Practical Object Recognition in Autonomous Driving and Beyond"; IEEE Workshop on Advanced Robotics and its Social Impacts (ARSO) (2011 ). (4 pages).
Held, et al., "Precision Tracking With Sparse 3D and Dense Color 2D Data"; International Conference on Robotics and Automation (ICRA) (2013). (8 pages).
Trifonov, Dmitry, "Real-Time High Resolution Fusion of Depth Maps on GPU"; Intl Conference on Computer-Aided Design and Computer Graphics (CAD/Graphics); Guangzhou, China (2013). (8 pages).
Abramov, et al., "Real-Time Image Segmentation on a GPU"; Facing the Multi-Core Challenge, pp. 131-142, Berlin, German (2010). (13 pages).
Levinson, et al., "Robust Vehicle Localization in Urban Environments Using Probabilistic Maps"; International Conference on Robotics and Automation (ICRA) (2010). (7 pages).
Hol, Jeroen; "Sensor Fusion and Calibration of Inertial Sensors, Vision, Ultra-Wideband and GPS"; Linkoping Studies in Science and Technology, Dissertations No. 1368; Department of Electrical Engineering; Linkoping University, SE-581 83 Linkoping, Sweden; (2011 ). (162 pages).
Ma, Lu et al., "Simultaneous Localization, Mapping, and Manipulation for Unsupervised Object Discovery"; IEEE International Conference on Robotics and Automation (ICRA); (2014). (8 pages).
Stanford Autonomous Driving Team website <http://driving.stanford.edu/papers.html>; Various; Stanford University 2014. (1 page).
Teichman, et al., "Towards 3D Object Recognition Via Classification of Arbitrary Object Tracks"; International Conference on Robotics and Automation (ICRA) (2011 ). (8 pages).
Teichman, et al., "Tracking-Based Semi-Supervised Learning"; Robotics: Science and Systems (RSS) (2011). (1 page).
U.S. Appl. No. 14/756,991, filed Nov. 4, 2015, Levinson, et al., "Sensor-based object-detection optimization for autonomous vehicles", (127 pages).
U.S. Appl. No. 14/756,992, filed Nov. 4, 2015, Levinson, et al., "Adaptive autonomous vehicle planner logic", (117 pages).
U.S. Appl. No. 14/756,993, filed Nov. 4, 2015, Kentley, et al., "Method for robotic vehicle communication with an external environment via acoustic beam forming", (77 pages).
U.S. Appl. No. 14/756,994, filed Nov. 4, 2015, Kentley, et al., "System of configuring active lighting to indicate directionality of an autonomous vehicle", (141 pages).
U.S. Appl. No. 14/756,995, filed Nov. 4, 2015, Kentley, et al., "Coordination of dispatching and maintaining fleet of autonomous vehicles", (131 pages).
U.S. Appl. No. 14/756,996, filed Nov. 4, 2015, Douillard, et al., "Calibration for Autonomous Vehicle Operation", (133 pages).
U.S. Appl. No. 14/757,015, filed Nov. 5, 2015, Kentley, et al., "Independent steering, power torque control and transfer in autonomous vehicles", (27 pages).
U.S. Appl. No. 14/757,016, filed Nov. 5, 2015, Levinson, et al., "Simulation system and methods for autonomous vehicles", (131 pages).
U.S. Appl. No. 14/932,940, filed Nov. 4, 2015, Levinson, et al., "Automated Extraction of Semantic Information to Enhance Incremental Mapping Modifications for Robotic Vehicles", (130 pages).
U.S. Appl. No. 14/932,948, filed Nov. 4, 2015, Kentley, et al., "Active Lighting Control for Communicating a State of an Autonomous Vehicle to Entities in a Surrounding Environment", (123 pages).
U.S. Appl. No. 14/932,952, filed Nov. 4, 2015, Kentley, et al., "Resilient Safety System for a Robotic Vehicle", (125 pages).
U.S. Appl. No. 14/932,954, filed Nov. 4, 2015, Kentley, et al., "Internal Safety Systems for Robotic Vehicles", (127 pages).
U.S. Appl. No. 14/932,958, filed Nov. 4, 2015, Kentley, "Quadrant Configuration of Robotic Vehicles", (57 pages).
U.S. Appl. No. 14/932,959, filed Nov. 4, 2015, Kentley, et al., Titled "Autonomous Vehicle Fleet Service and System", (103 pages).
U.S. Appl. No. 14/932,962, filed Nov. 4, 2015, Kently, et al., "Robotic Vehicle Active Safety Systems and Methods", (109 pages).
U.S. Appl. No. 14/932,963, field Nov. 4, 2015, Levinson, et al., "Adaptive Mapping to Navigate Autonomous Vehicles Responsive to Physical Environment Changes", (133 pages).
U.S. Appl. No. 14/932,966, filed Nov. 4, 2015, Levinson et al., "Teleoperation System and Method for Trajectory Modification of Autonomous Vehicles", (131 pages).
U.S. Appl. No. 14/933,469, filed Nov. 5, 2015, Kentley, et al., "Software Application to Request and Control an Autonomous Vehicle Service", (146 pages).
U.S. Appl. No. 14/933,602, filed Nov. 5, 2015, Levinson, et al., "Machine-Learning Systems and Techniques to Optimize Teleoperation and/or Planner Decisions", (123 pages).
U.S. Appl. No. 14/933,665, filed Nov. 5, 2015, Kentley, et al., "Software Application and Logic to Modify Configuration of an Autonomous Vehicle", (144 pages).
U.S. Appl. No. 14/933,706, filed Nov. 5, 2015, Kentley et al., "Interactive Autonomous Vehicle Command Controller", (145 pages).
Held, et al., "A Probabilistic Framework for Object Detection in Images Using Context and Scale"; International Conference on Robotics and Automation (ICRA) (2012). (7 pages).
Xu, et al., "A Real-Time Motion Planner With Trajectory Optimization for Autonomous Vehicles"; Robotics and Automation (ICRA); Saint Paul, MN, USA (2012) (7 pages).
Grisetti, et al., "A Tutorial on Graph-Based Slam"; Intelligent Transportation Systems Magazine, IEEE; pp. 31-43 (2010). (11 pages).
Morton, et al., "An Evaluation of Dynamic Object Tracking With 3D LIDAR"; Proceedings of Australasian conference on Robotics and Automation; Dec. 7-9, 2011; Melbourne, Australia (2011) (10 pages).
Ma, et al., "Simultaneous Localization, Mapping, and Manipulation for Unsupervised Object Discovery"; IEEE International Conference on Robotics and Automation (ICRA); (2014). (8 pages).
Levison, "Automatic Laser Calibration, Mapping, and Localization for Autonomous Vehicles", Thesis (Ph D); Stanford University (2011 ). (153 pages).
Levinson, et al., "Automatic Online Calibration of Cameras and Lasers"; Robotics: Science and Systems (RSS) (2013). (8 pages).
Bayazit et al., "Swarming Behavior Using Probabilistic Roadmap Techniques", Swarm Robotics WS 2004, LNCS, Springer-Verlag Berlin Heidelberg 2005, pp. #112-pp. #125, (14 pages).
Bodensteiner et al., "Monocular Camera Trajectory Optimization using LiDAR Data", IEEE International Conference on Computer Vision Workshops, 2011, 8 pages.
Held, et al., "Combining 3D Shape, Color, and Motion for Robust Anytime Tracking"; Robotics: Science and Systems (RSS), Berkeley, California, USA (2014).
Eckes, et al., "Combining Data-Driven and Model-Based Cues for Segmentation of Video Sequences"; Proceedings WCNN '96, San Diego, USA (1996). (8 pages).
Zhang, et al., "Control of Robotic Mobility-On Demand Systems: A Queueing—Theoretical Perspective"; Intl Journal of Robotics Research, pp. 1-18, Stanford, USA (2015). (18 pages).
Agha-mohammadi, et al., Dynamic Real-Time Replanning in Belief Space: An Experimental Study on Physical Mobile Robots;Technical Report TR 13-007; Texas A&M University, USA (2013). (26 pages).

(56) References Cited

OTHER PUBLICATIONS

Easymile (website), Retrieved from <<https://web.archive.org/web/20150723060050/http://easymile.com>> Jul. 2015, <<https://web.archive.org/web/201508012054107/http://easymile.com/mobility-soulition/>>, Aug. 2015, and <<http: www.youtube.com/watch?v=fijDBL76yDY>>, Feb. 2015, (13 pages).

Kong, Linghe et al., "Evaluation of Urban Vehicle Routing Algorithms"; Intl Journal of Digital Content Technology and its Applications (JDCTA); vol. 6, No. 23, University of New Mexico, USA (2012). (10 pages).

Lee et al., "Exponential Family Sparse Coding With Application to Self-Taught Learning"; International Joint Conference on Artificial Intelligence (IJCAI) (2009). (7 pages).

Teichman, et al., "Group Induction"; Proc. of the IEEE/RSJ Intl Conf on Intelligent Robotics and Systems (IROS) (2013) (7 pages).

Ma, et al., "Large Scale Dense Visual Inertial Slam"; Field and Service Robotics (FSR); (2015). (14 pages).

Levinson, et al., "Map-Based Precision Vehicle Localization in Urban Environments"; Robotics: Science and Systems (RSS) (2007). (8 pages).

Levinson, et al.; "Towards Fully Autonomous Driving: Systems and Algorithms"; Intelligent Vehicles Symposium (2011). (6 pages).

Levinson, et al., "Traffic Light Mapping, Localization, and State Detection for Autonomous Vehicles"; International Conference on Robotics and Automation (ICRA) (2011 ). (8 pages).

Levinson et al., "Unsupervised Calibration for Multi-Beam Lasers"; International Symposium on Experimental Robotics (ISER) (2010). (8 pages).

Office action for U.S. Appl. No. 14/932,962, dated Mar. 21, 2016, Kentley et al., "Robotic Vehicle Active Safety Systems and Methods", 18 pages.

Office action for U.S. Appl. No. 14/932,948, dated Oct. 14, 2016, Kentley et al., "Active Lighting Control for Communicating a State of an Autonomous Vehicle to Entities in a Surrounding Environment", 15 pages.

Office action for U.S. Appl. No. 14/756,995, dated Oct. 31, 2016, Kentley et al., "Coordination of dispatching and maintaining fleet of autonomous vehicles", 35 pages.

Office action for U.S. Appl. No. 14/932,963, dated Mar. 17, 2016, Levinson et al., "Adaptive Mapping to Navigate Autonomous Vehicles Responsive to Physical Environment Changes", 26 pages.

Office action for U.S. Appl. No. 14/932,954, dated Mar. 29, 2016, Kentley et al., "Internal Safety Systems for Robotic Vehicles", 17 pages.

Office action for U.S. Appl. No. 14/932,940, dated May 4, 2016, Levinson et al., "Automated Extraction of Semantic Information to Enhance Incremental Mapping Modifications for Robotic Vehicles", 22 pages.

Office action for U.S. Appl. No. 14/757,015, dated Mar. 27, 2017, Kentley et al., "Independent steering, power torque control and transfer in autonomous vehicles," 14 pages.

PCT Search Report and Written Opinion dated Mar. 30, 2017 for PCT Application No. PCT/US16/60121, 9 pages.

Automatic Online Calibration of Cameras and Lasers; Levinson, et al. Robotics:Science and Systems (RSS) 2013, 8 pages.

Office action for U.S. Appl. No. 14/932,959, dated Dec. 2, 2016, Kentley et al., "Autonomous Vehicle Fleet Service and System", 21 pages.

PCT Search Report and Written Opinion dated Feb. 2, 2017 for PCT Application No. PCT/US16/60104, 11 pages.

* cited by examiner

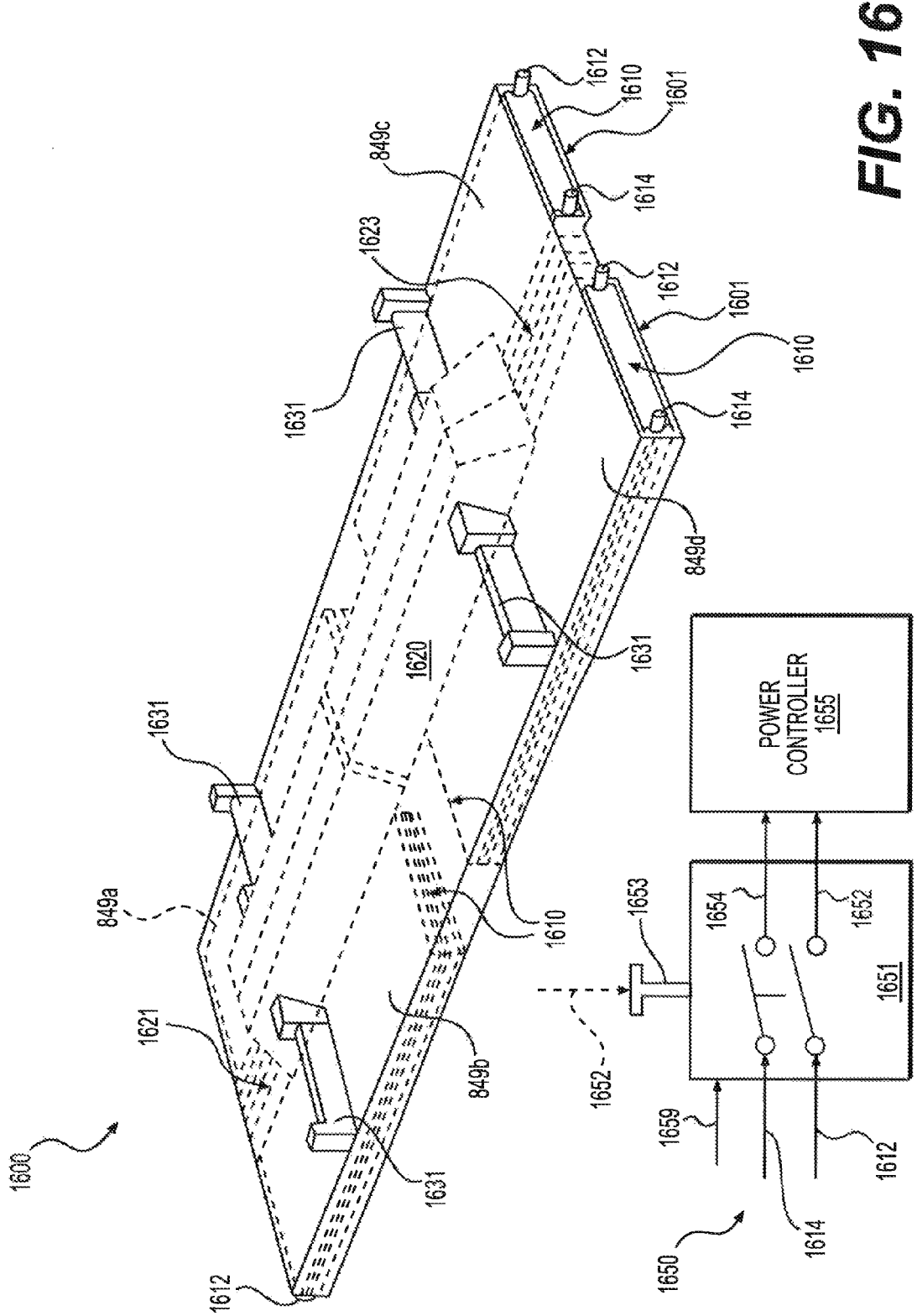

QUADRANT CONFIGURATION OF ROBOTIC VEHICLES

CROSS-REFERENCE TO RELATED APPLICATIONS

This application is a continuation of U.S. application Ser. No. 14/932,958, filed Nov. 4, 2015, entitled "Quadrant Configuration of Robotic Vehicles," which is related to U.S. patent application Ser. No. 14/932,959 filed Nov. 4, 2015 entitled "Autonomous Vehicle Fleet Service and System," U.S. patent application Ser. No. 14/932,963, filed Nov. 4, 2015 entitled "Adaptive Mapping to Navigate Autonomous Vehicles Responsive to Physical Environment Changes," and U.S. patent application Ser. No. 14/932,962, filed Nov. 4, 2015 entitled "Robotic Vehicle Active Safety Systems and Methods," all of which are hereby incorporated by reference in their entirety for all purposes.

FIELD

Embodiments of the present application relate generally to methods, systems and apparatus for configuring robotic vehicles.

BACKGROUND

Autonomous vehicles configured to transport passengers, goods, materials and the like may often be based on vehicles that may include unnecessary apparatus and systems that may serve no functional purpose if the autonomous vehicle is configured to autonomously navigate and maneuver over a planned route. Therefore, a steering wheel, brake pedal, throttle pedal, turn signal stalk, rear view mirror, side view mirrors, wiper controls, a dashboard, gauges, a windshield, a backlight glass (e.g., rear glass), a parking brake, seats that face the direction of travel (e.g., facing a windshield or windscreen) and the like may not be necessary because the autonomous vehicle ought to be able to autonomously direct operation of the autonomous vehicle without the need for human interaction and/or without unnecessary structure determined by the need for human interaction with and/or control of the vehicle (e.g., the driver facing the windshield thus requiring a forward facing seat), for example.

Moreover, a configuration of a conventional vehicle that is re-tasked as an autonomous vehicle may often constrained by vehicle design and manufacturing processes associated with human driver-based vehicles, even though a configuration of a driverless vehicle need not be constrained by conventional design and manufacturing paradigms.

Accordingly, there is a need for systems, apparatus and methods for implementing driverless robotic vehicles.

BRIEF DESCRIPTION OF THE DRAWINGS

Various embodiments or examples ("examples") are disclosed in the following detailed description and the accompanying drawings:

FIG. 16 depicts a perspective view of an example of a floor base of an autonomous vehicle.

Figure 1A:
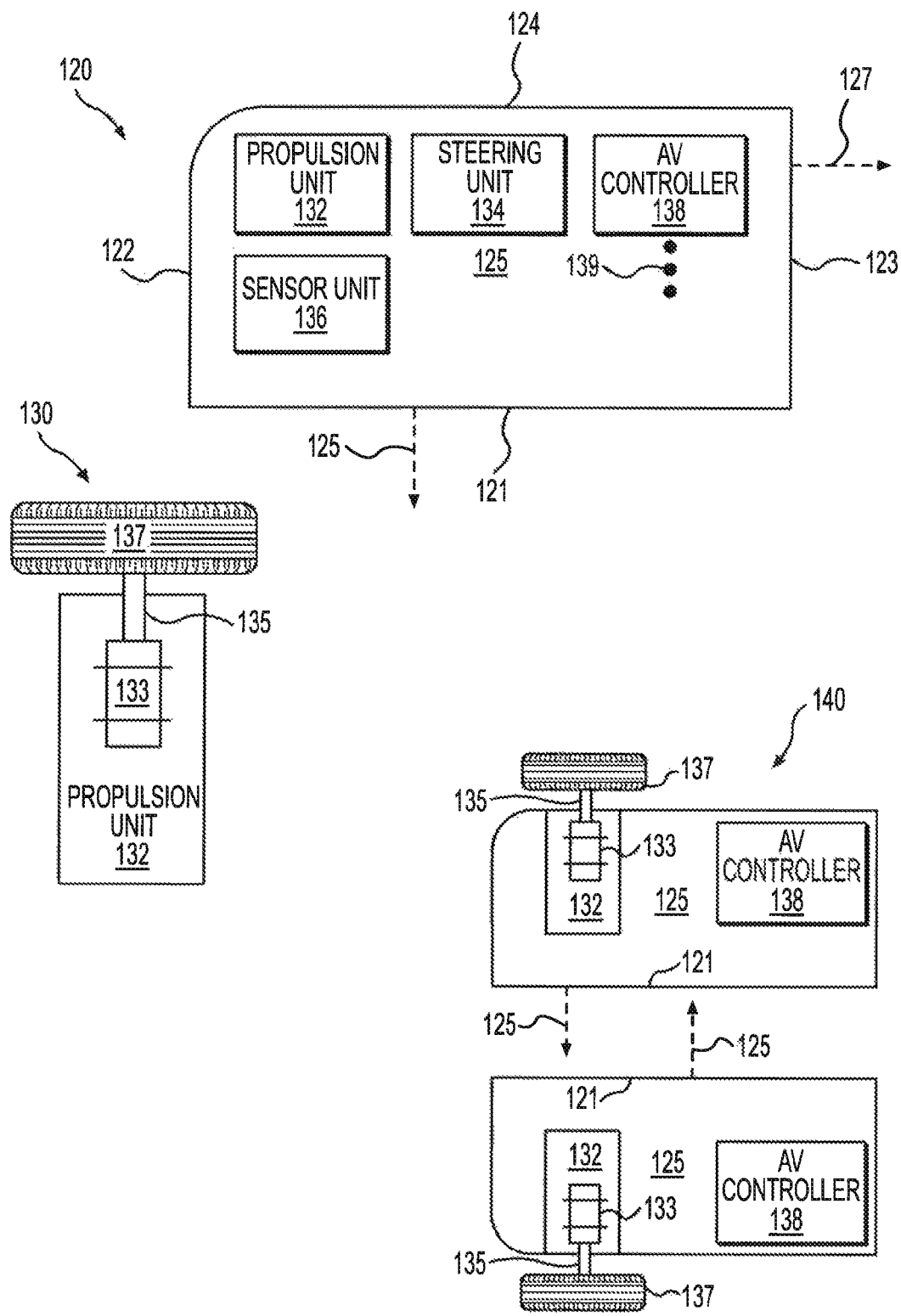
FIG. 1A depicts examples of a structural section of an autonomous vehicle.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, a method, an apparatus, a user interface, software, firmware, logic, circuity, or a series of executable program instructions embodied in a non-transitory computer readable medium. Such as a non-transitory computer readable medium or a computer network where the program instructions are sent over optical, electronic, or wireless communication links and stored or otherwise fixed in a non-transitory computer readable medium. Examples of a non-transitory computer readable medium includes but is not limited to electronic memory, RAM, DRAM, SRAM, ROM, EEPROM, Flash memory, solid-state memory, hard disk drive, and non-volatile memory, for example. One or more non-transitory computer readable mediums may be distributed over a number of devices. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

FIG. 1A depicts examples 120 and 140 of a structural section 125 of an autonomous vehicle. In example 120 a structural section 125 may include exterior surfaces 122 and 124 that may be exposed to an environment external to the autonomous vehicle (not shown), inner surfaces 121 and 123 that may be configured to couple with inner surfaces 121 and 123 of other structural sections 125, a propulsion unit 132 being configured to propel the autonomous vehicle along a trajectory, a steering unit 134 being configured to steer a wheel coupled to the propulsion unit, a sensor unit being configured to sense the environment external to the autonomous vehicle, and optionally an autonomous vehicle (AV) controller 138 in electrical communication with the sensor unit 136, the steering unit 134 and the propulsion unit 132. In some examples, the autonomous vehicle controller 138 may be in electrical communication with the sensor unit 136, the steering unit 134 and the propulsion unit 132 in one or more other structural section 125. In other examples, the autonomous vehicle controller 138 may not reside in structural section 125 and the sensor unit 136, the steering unit 134 and the propulsion unit 132 may be in electrical communication with the autonomous vehicle controller 138 in one or more other structural sections 125. The structural section 125 may be coupled (e.g., as denoted by dashed arrows 125 and 127) to another structural section 125 by connecting similar inner surfaces such as inner surface 123 of one structural section 125 with the inner surface 123 of a second structural section 125, or inner surface 121 of one structural section 125 with the inner surface 121 of a second structural section 125, for example. Coupling of one structural section 125 to another structural section 125 may be implemented through a suitable connection method including but not limited to fasteners (e.g., screws, bolts, and rivets), a snap connection, glue, an adhesive, fusion, welding, and brazing, etc., for example.

In example 130, the propulsion unit 132 may include a motor 133 (e.g., an electric motor) coupled to an axle 135 which is coupled to a wheel 137, for example. The sensor unit 136, the steering unit 134 the propulsion unit 132, and the autonomous vehicle controller(s) may be in electrical communication with one or more power units (not shown), such as a battery, a rechargeable battery, a fuel cell, or other power source suitable for an autonomous vehicle, for example.

In example 140, one skilled in the art will appreciate that the propulsion unit 132 and its associated components (e.g., motor 133, axel 135 and wheel 137) may be disposed in the structural unit 125 in different orientations to form structural units 125 that may be mirror images of each other to facilitate coupling 125 of structural units 125 having the propulsion units on opposed sides. For example, the configuration depicted in example 140, after being coupled together, may be replicated to form the autonomous vehicle, such that the autonomous vehicle may constitute four of the structural units 125 coupled with one another and having four wheels 137 disposed proximate corners of the autonomous vehicle.

Figure 1B:
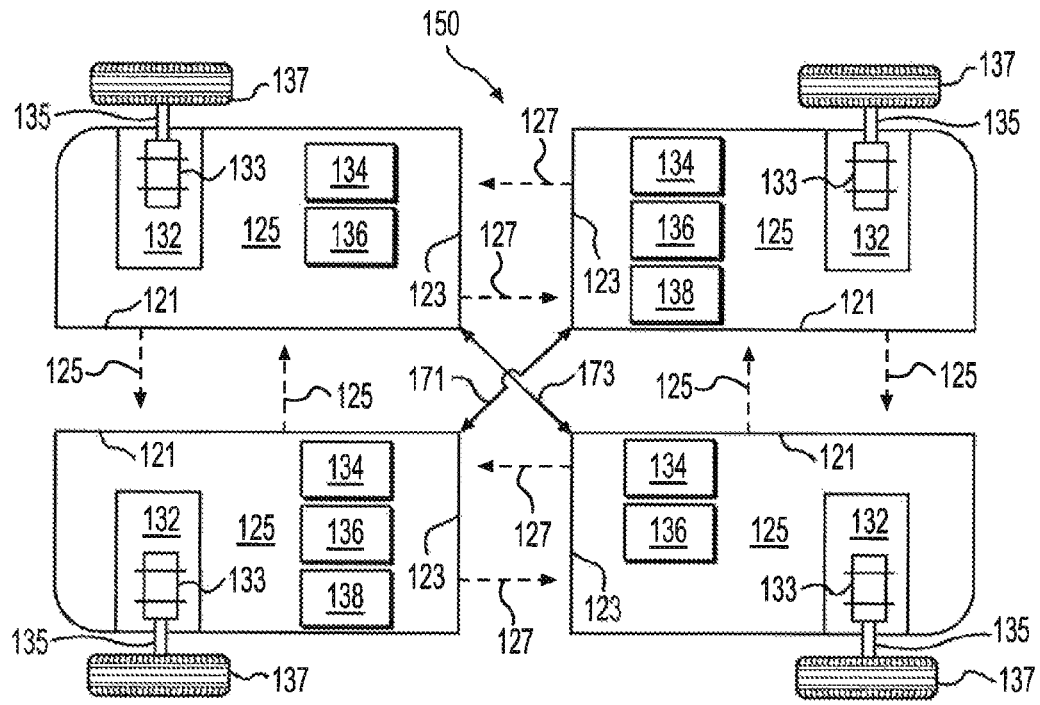
FIG. 1B depicts examples of structural sections of an autonomous vehicle.
Figure 1B:
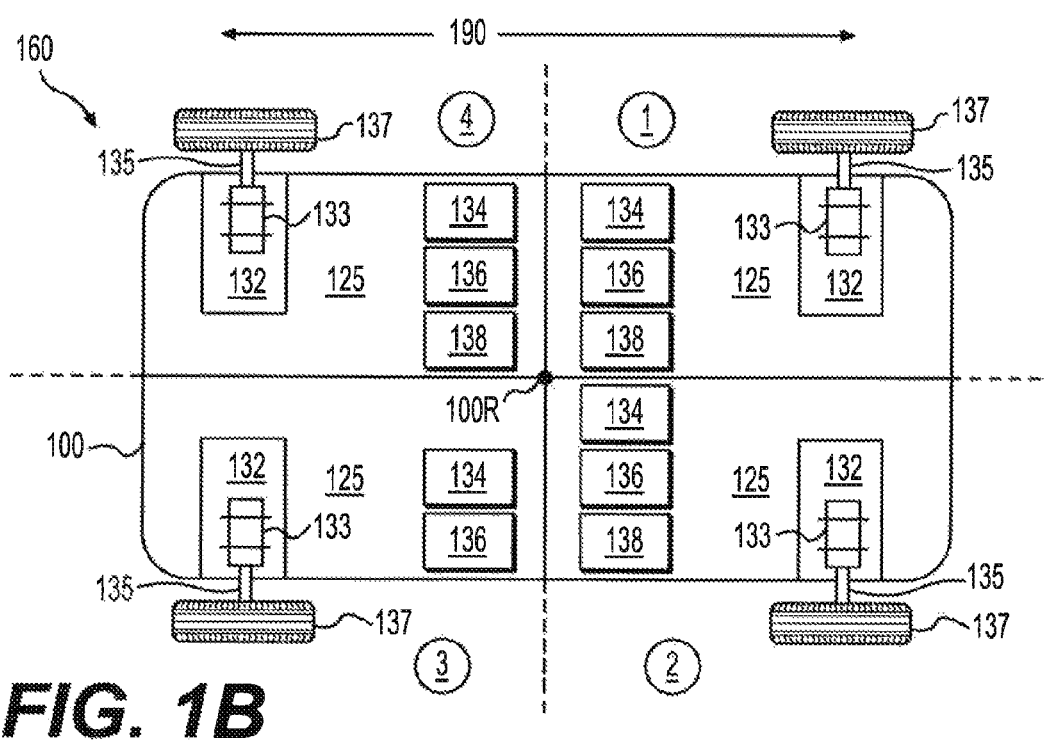

FIG. 1B depicts examples 150 and 160 of structural sections 125 of an autonomous vehicle. In example 150, four of the structural sections 125 may be coupled (125, 127) to one another to form an autonomous vehicle 100 as depicted in example 160. Further to example 150, structural sections 125 that are diagonally disposed 171 from each other may constitute structural sections 125 that may be mirror images of each other, and structural sections 125 that are diagonally disposed 173 from each other may also constitute structural sections 125 that may be mirror images of each other.

In example 160, the four structural sections 125 are depicted as being coupled to one another to form the autonomous vehicle 100. The autonomous vehicle 100 may not have a front or a rear and may be configured for bidirectional travel in a direction denoted by double-arrow 190. As one example, the autonomous vehicle 100 may not backup (e.g., reverse) to change direction of travel, and may instead stop driving in a first direction and continue travel in a second direction. The four structural sections 125 may be symmetrically disposed relative to each other (e.g., symmetrical relative to a point of reference 100r on the vehicle 100). Each structural section 125 may constitute a quadrant, denoted by circles 1-4, of the autonomous vehicle 100.

In examples 150 and 160, the autonomous vehicle controller 138 may be replicated in one or more of the structural sections 125. For example, the autonomous vehicle 100 may include two autonomous vehicle controllers 138 disposed in different structural sections 125 to implement double redundancy in vehicle 100 control (e.g., control of the steering, propulsion, sensor, safety systems, and optionally, brake units of the vehicle 100). As another example, the autonomous vehicle 100 may include three autonomous vehicle controllers 138 disposed in different structural sections 125 to implement triple redundancy in vehicle 100 control (e.g., control of the steering, propulsion, sensor, safety systems, and optionally, brake units of the vehicle 100) and/or signal output from sensors of sensor units 136. As yet another example, the autonomous vehicle 100 may include four autonomous vehicle controllers 138 disposed in different structural sections 125 to implement quadruple redundancy in vehicle 100 control (e.g., control of the steering, propulsion, sensor, safety systems, and optionally, brake units of the vehicle 100).

Figure 1C:
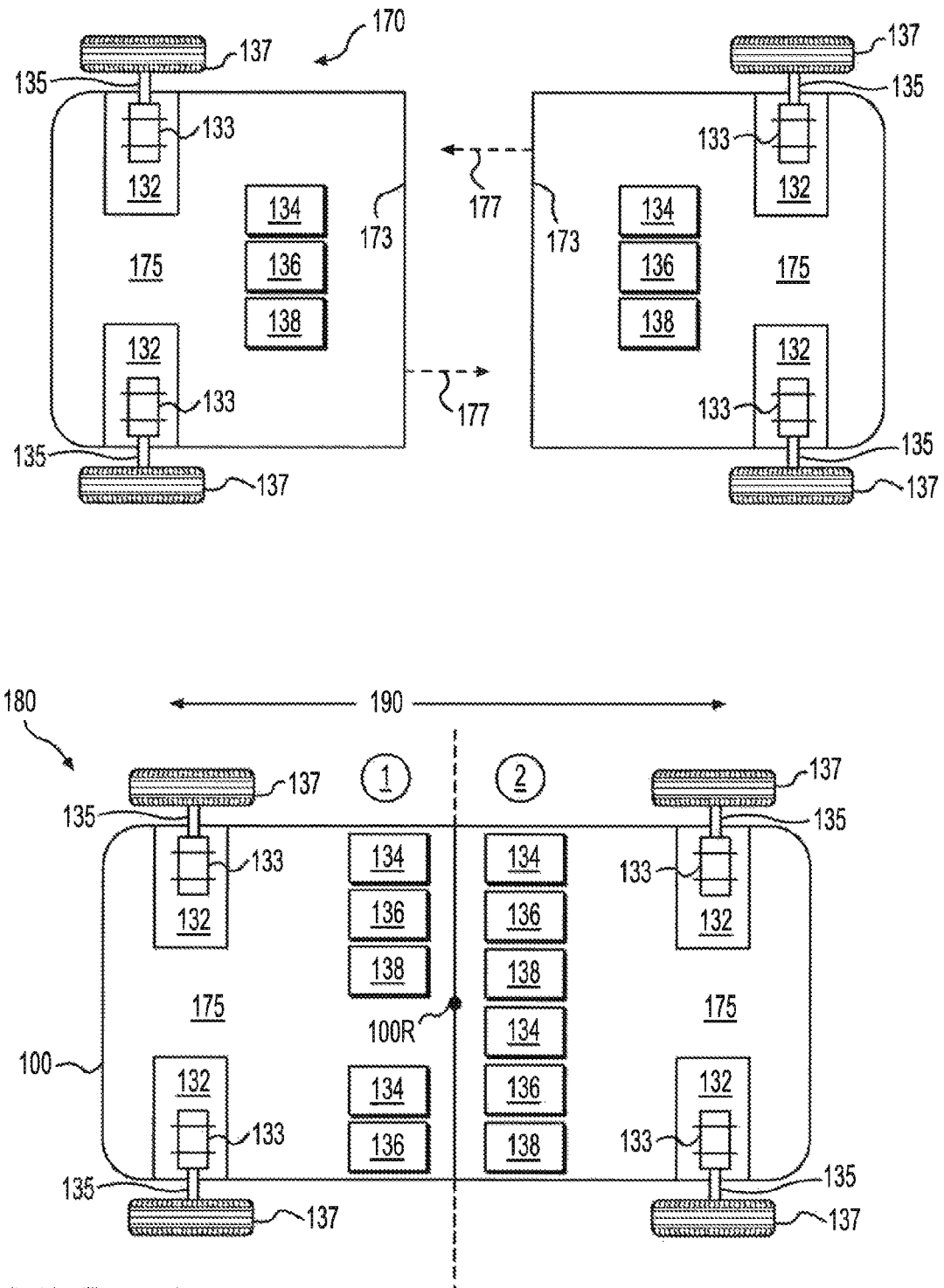
FIG. 1C depicts other examples of structural sections of an autonomous vehicle.

FIG. 1C depicts other examples 170 and 180 of structural sections of an autonomous vehicle 100. In example 170, two structural sections 175 may be coupled 177 with each other to form the autonomous vehicle 100 depicted in example 180. The two structural sections 175 may be symmetrically disposed relative to each other (e.g., relative to point of reference 100r). Each structural section may include two propulsion units 132, each propulsion unit 132 having the motor 133 coupled to the axle 135, the axle 135 coupled to the wheel 137, for example. The autonomous vehicle 100 may be configured to implement double redundancy, triple redundancy or quadruple redundancy in autonomous vehicle controllers 138, with the autonomous vehicle controllers 138 being distributed between the two structural sections 175, for example. Each structural section 175 may constitute one-half of the autonomous vehicle 100 as denoted by circles 1-2. As described above in reference to example 160 of FIG. 1B, the autonomous vehicle 100 may implement bidirectional travel as denoted by double arrow 190.

Figure 1D:
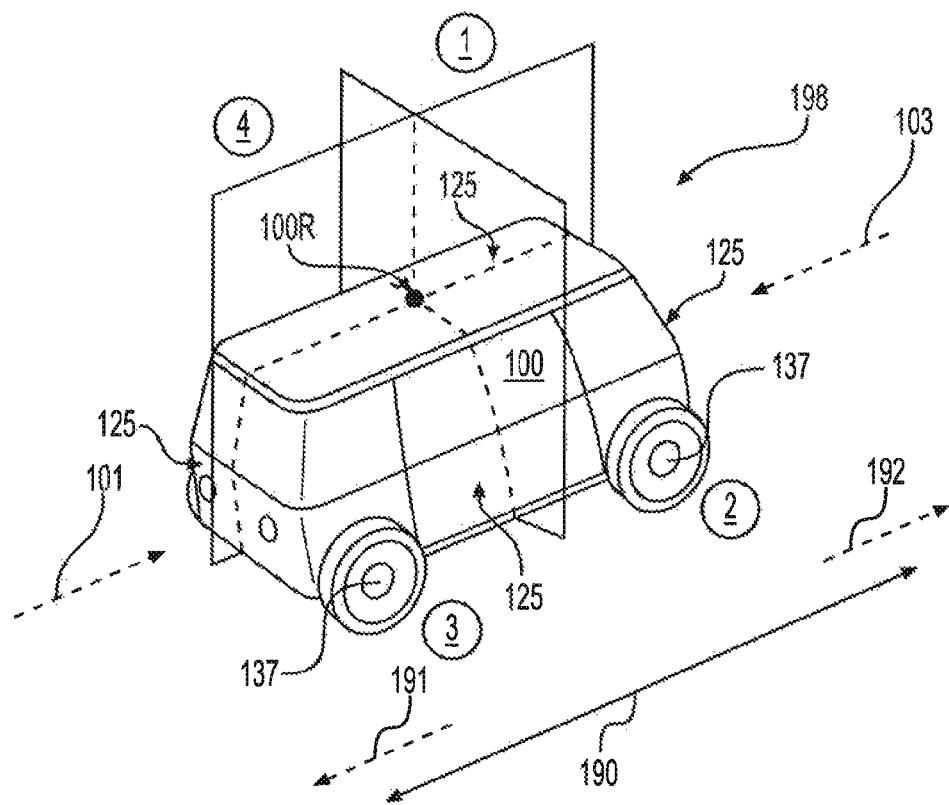
FIG. 1D depicts a profile view of one example of an autonomous vehicle.
Figure 1D:
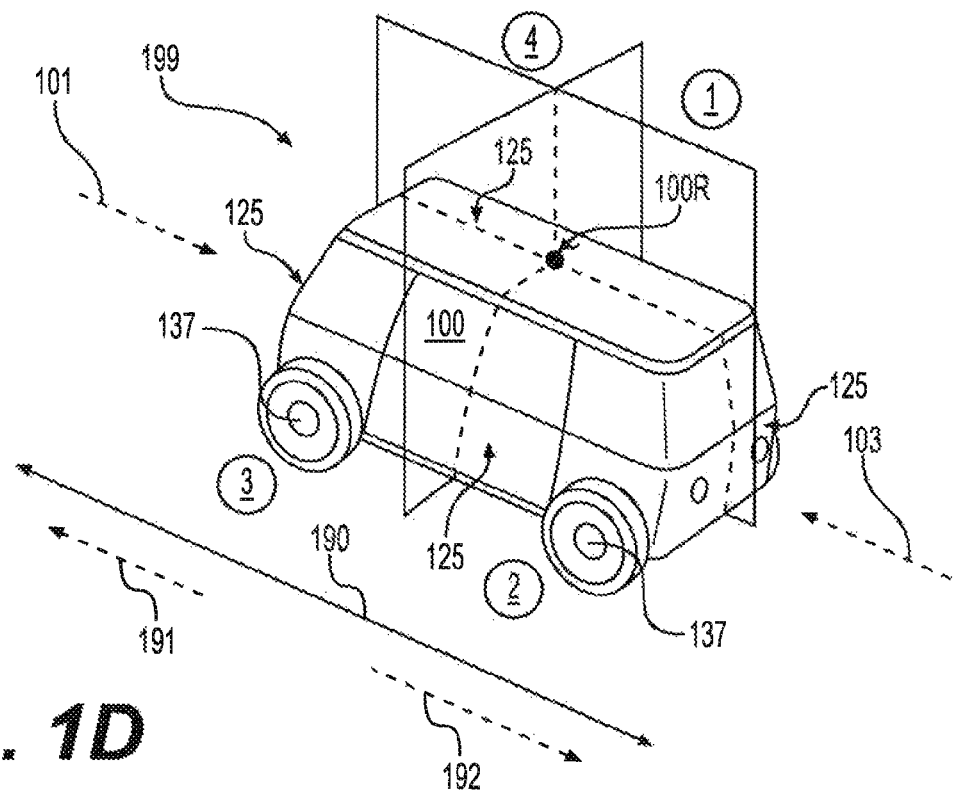

FIG. 1D depicts a profile view of one example 198 of an autonomous vehicle 100. In example 198, a profile view of a first end of the autonomous vehicle 100 (e.g., looking along the direction of arrow 101) depicts the four structural sections 125 coupled to each other (e.g., denoted by dashed lines). The four structural sections 125 may be symmetrically disposed relative to each other (e.g., relative to point of reference 100r). The autonomous vehicle 100 may travel bi-directionally with the first end of the vehicle 100 moving in a first direction 191, for example.

In example 199, a profile view of a second end of the autonomous vehicle 100 (e.g., looking along the direction of arrow 103) depicts the four structural sections 125 coupled to each other (e.g., denoted by dashed lines). The four structural sections 125 may be symmetrically disposed relative to each other (e.g., relative to point of reference 100r), for example. The autonomous vehicle 100 may travel bi-directionally with the second end of the vehicle 100 moving in a second direction 192 that is opposite to the first direction 191, for example.

In examples 198 and 199, one skilled in the art will appreciate that the one or more of the structural sections 125 may include additional structure such as windows, doors, and a roof, for example.

Figure 1E:
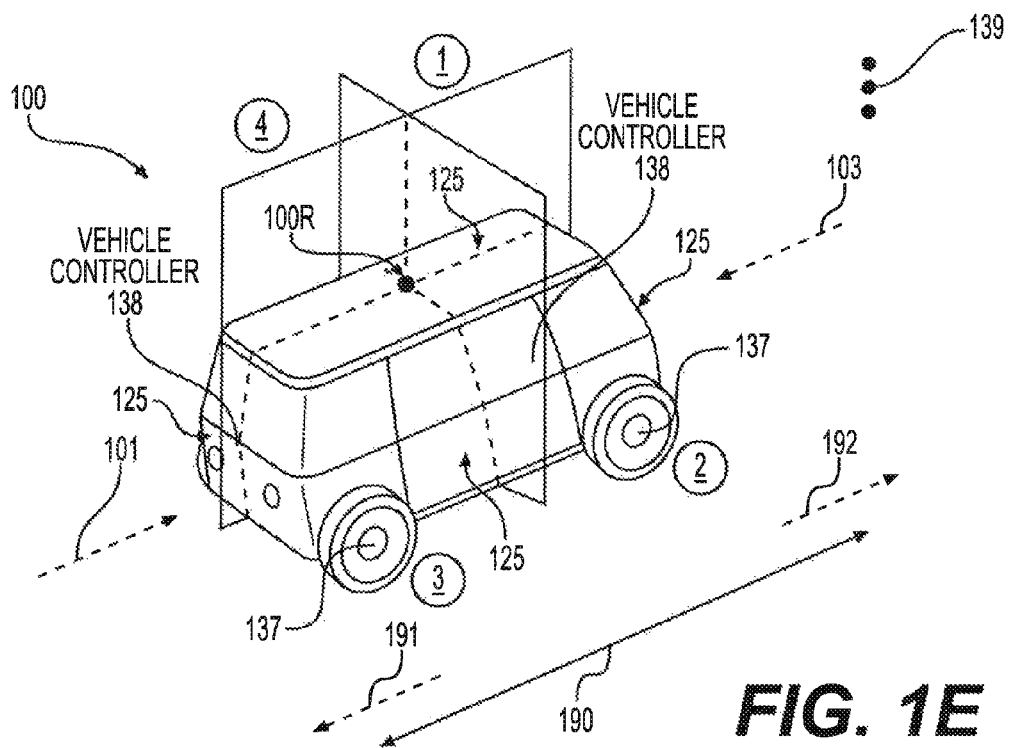
FIG. 1E depicts a profile view of another example of an autonomous vehicle.

FIG. 1E depicts a profile view of another example of an autonomous vehicle 100. In FIG. 1E, the autonomous vehicle 100 may include the four structural sections 125, and autonomous vehicle controllers 138 may be distributed among the structural sections 125 to provide double, triple or quadruple redundancy as described above, for example. There may be more or fewer of the autonomous vehicle controllers 138 than depicted in FIG. 1E as denoted by 139, for example.

Figure 1F:
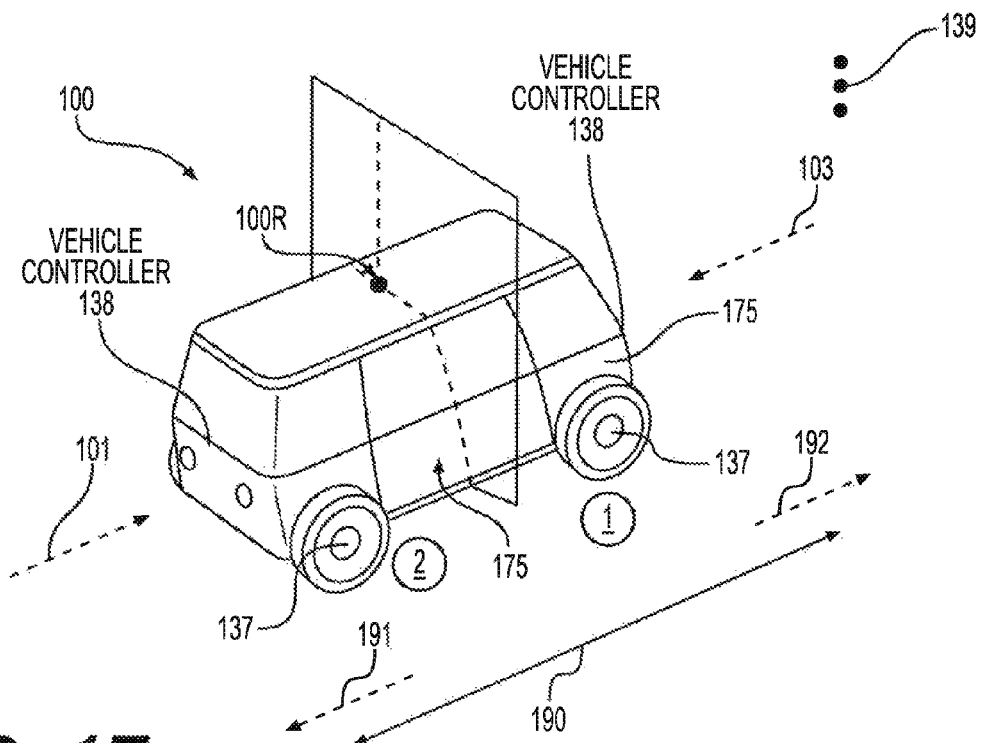
FIG. 1F depicts a profile view of yet another example of an autonomous vehicle.

FIG. 1F depicts a profile view of yet another example of an autonomous vehicle 100. In FIG. 1F, the autonomous vehicle 100 may include the two structural sections 175 (e.g., a first-half and a second-half), for example. The autonomous vehicle controllers 138 may be distributed among the structural sections 175 to provide double, triple, or quadruple redundancy as described above, for example. There may be more or fewer of the autonomous vehicle controllers 138 than depicted in FIG. 1F as denoted by 139, for example. The structural sections 175 may be symmetrically disposed relative to each other (e.g., relative to point of reference 100r), for example. The autonomous vehicle 100 may travel bi-directionally with the first end of the vehicle 100 moving in a first direction 191, for example. The autonomous vehicle 100 may travel bi-directionally with the second end of the vehicle 100 moving in a second direction 192 that is opposite to the first direction 191, for example.

Figure 2:
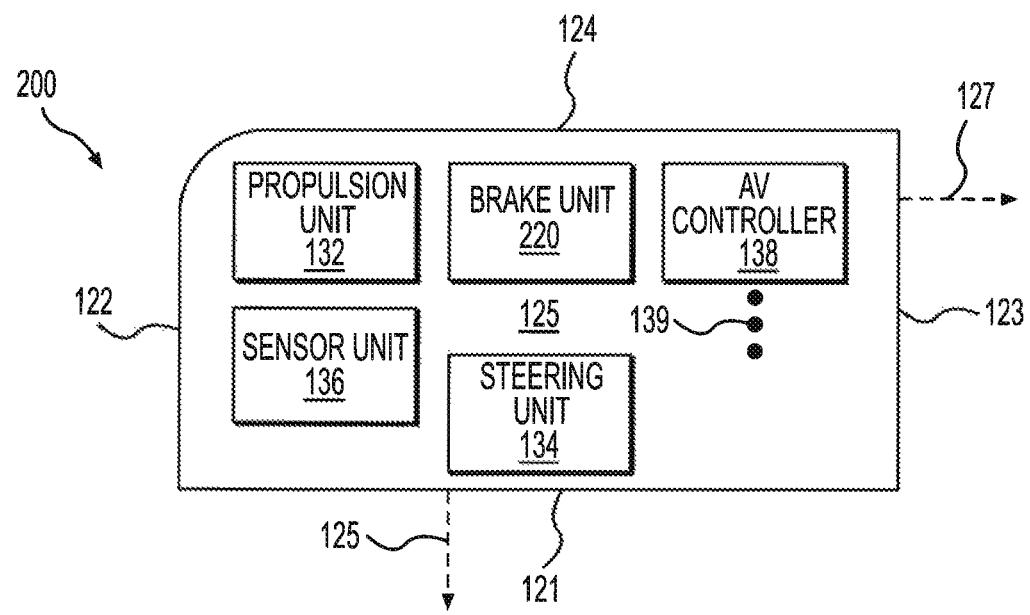
FIG. 2 depicts examples of a brake unit of an autonomous vehicle.
Figure 2:
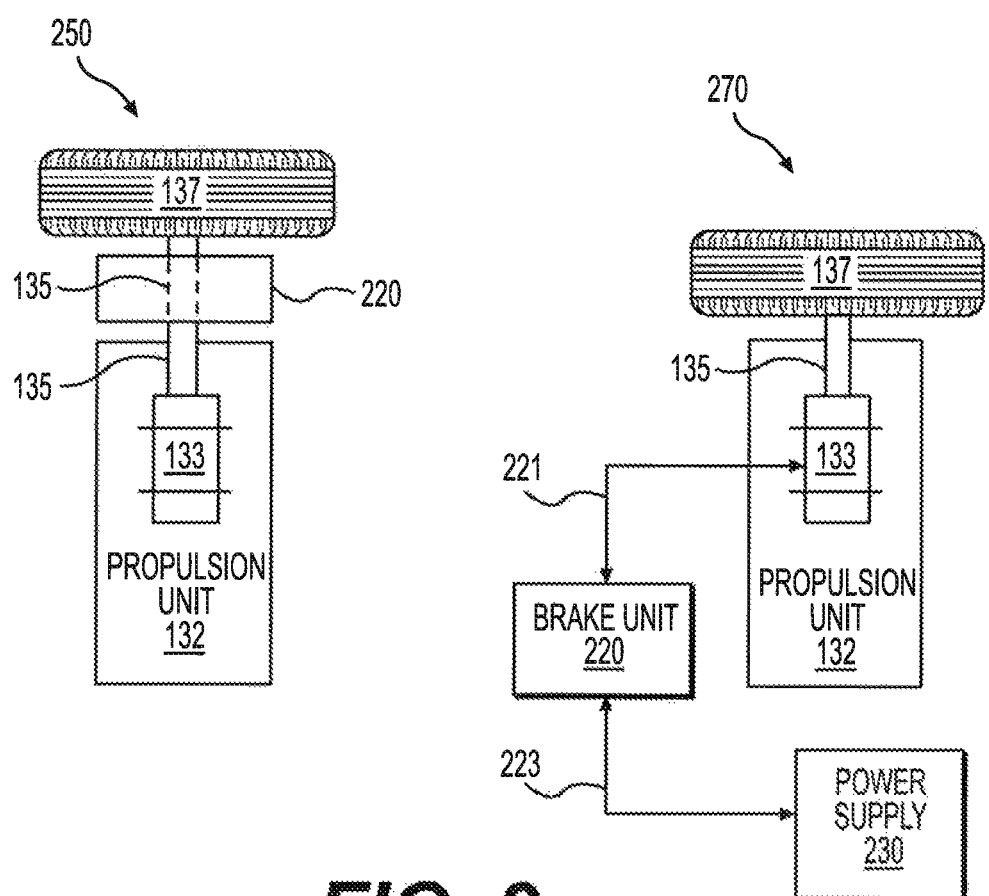

FIG. 2 depicts examples 200, 250 and 270 of a brake unit of an autonomous vehicle 100. In example 200, the structural section 125 may include a brake unit 220 in electrical communication with one or more of the autonomous vehicle controllers 138. Brake unit 220 may be configured to implement 100 breaking and/or regenerative breaking of the autonomous vehicle 100, for example. In example 250, the break unit 220 may be coupled to the axle 135 and may apply a breaking force (e.g., using brake pads or brake shoes) to the axle 135 or other structure associated with wheel 137 and/or motor 133. As one example, the break force may be applied hydraulically, pneumatically, or electronically.

In example 270, the break unit 220 may be electrically coupled 221 with the motor 133 and may be configured to implement regenerative breaking of the autonomous vehicle 100. Energy (e.g., electrical power) generated by regenerative breaking of the autonomous vehicle 100 may be coupled 223 with one or more power supplies 230 of the autonomous vehicle 100 to replenish a source of energy used to power the autonomous vehicle 100 (e.g., one or more rechargeable batteries).

Figure 3A:
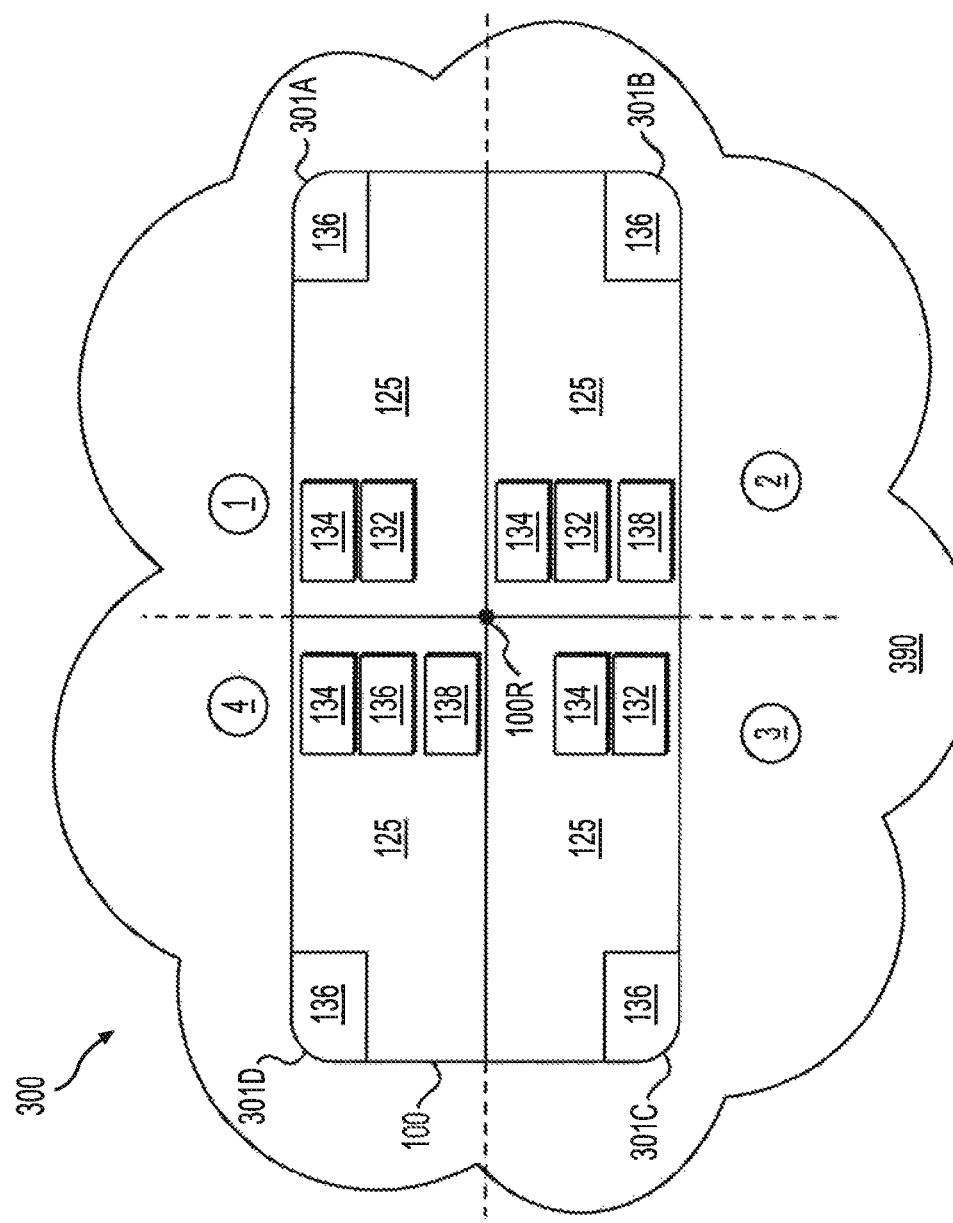
FIG. 3A depicts one example of a symmetrically disposed sensor suites of a sensor system of an autonomous vehicle.

FIG. 3A depicts one example 300 of a symmetrically disposed sensor suites 301a-301d of a sensor system of an autonomous vehicle 100. In example 300, the sensor units 136 in sensor suites 301 a-301 d may be symmetrically disposed relative to each other (e.g., relative to point of reference 100r) on the autonomous vehicle 100. For example, each sensor unit 136 may be disposed at corners of their respective structural section 125 such that when the structural sections 125 are coupled to each other, the sensor units 136 are symmetrically disposed relative to each other. In some examples, sensor units 136 in each of the four quadrants 1-4 may have a region of sensor coverage of the environment external 390 external to the autonomous vehicle 100 that overlaps with the region of sensor coverage of another sensor unit 136 in another quadrant. The sensor units 136 in each of the sensor suites 301a-301d may include several types of sensors that are different than each other, such as light detection and ranging sensors (LIDAR) (e.g., LIDAR, color LIDAR, three-dimensional LIDAR, etc.), image capture sensors (e.g., digital cameras, digital video cameras, stereo cameras, etc.), and radio detection and ranging (RADAR) sensors, for example. The several types of sensors may include one or more of the same type of sensor, such as multiple light detection and ranging sensors (LIDAR), multiple image capture sensors, and multiple radio detection and ranging (RADAR) sensors, for example.

Figure 3B:
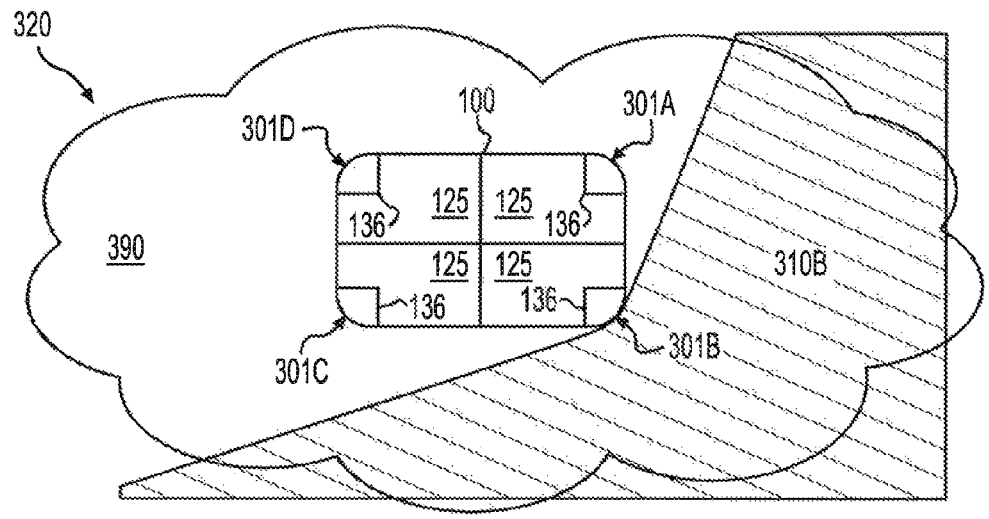
FIG. 3B depicts one example of a region of sensor coverage for a sensor suite of an autonomous vehicle.

FIG. 3B depicts one example 320 of a region of sensor coverage for a sensor suite of an autonomous vehicle 100. In example 320, the sensor unit 136 in sensor suite 310b may have a region of sensor coverage of environment 390 denoted by 310b, and the region of sensor coverage 310b may be greater than 180 degrees. The region of sensor coverage 310b may overlap with regions of sensor coverage associated with sensor suites 301a and 301c, for example.

Figure 3C:
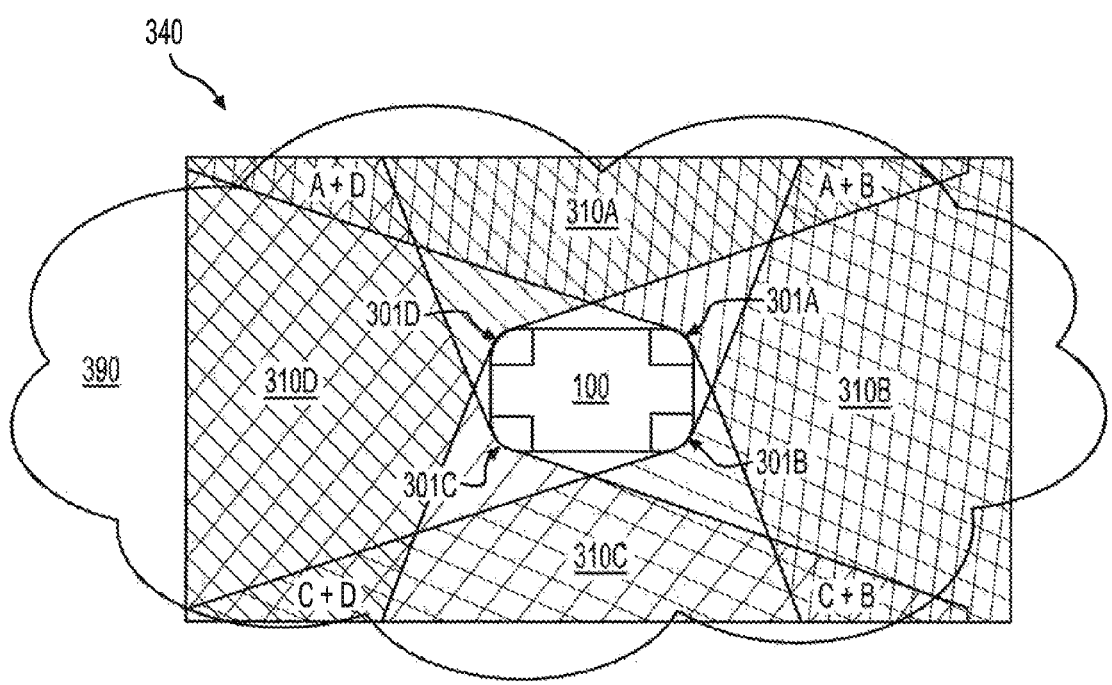
FIG. 3C depicts one example of overlapping regions of sensor coverage for sensor suites of an autonomous vehicle.

FIG. 3C depicts one example 340 of overlapping regions of sensor coverage for sensor suites 301a-301d of an autonomous vehicle 100. In example 340, each of the sensor units 136 in sensor suites 301a-301d may individually have region of sensor coverage 310a, 310b, 310c and 310d that may overlap with each other as denoted by regions of overlap a+b, C+b, C+d, and a+d. The overlapping regions of sensor coverage may implement 360 degrees of sensor coverage of the environment 390 external to the autonomous vehicle 100. The overlapping regions of sensor coverage may implement redundant sensor coverage in the event one or more sensors in one or more of the sensor suites 301a-301d are damaged, malfunction, or are otherwise rendered inoperable.

Figure 3D:
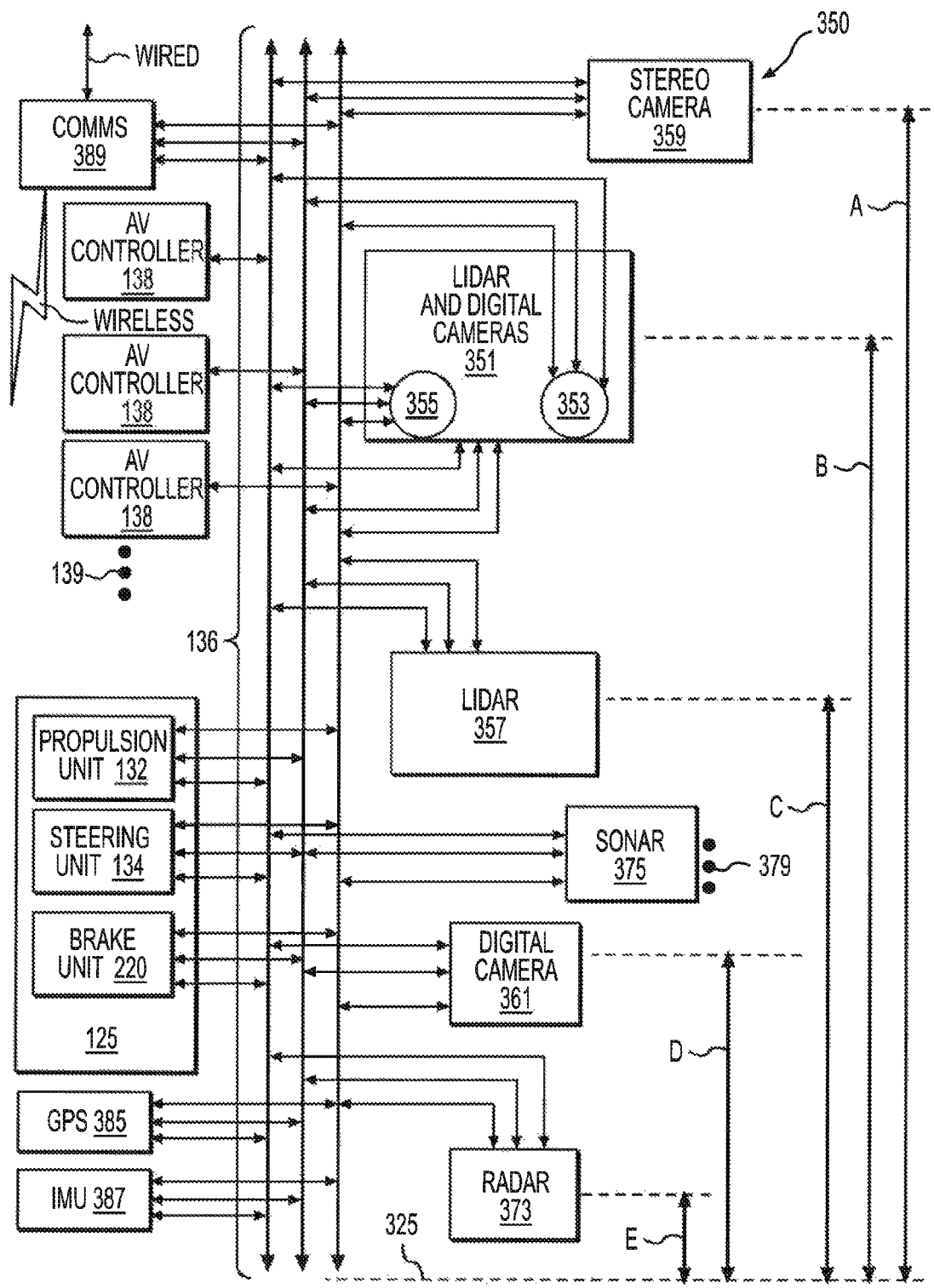
FIG. 3D depicts one example of a different sensor types in an autonomous vehicle.

FIG. 3D depicts one example 350 of a different sensor types in an autonomous vehicle 100. There may be multiple instances of the same sensor type in the autonomous vehicle

100. The autonomous vehicle 100 may include a communications unit 389 (COMMS) being configured to communicate (e.g., transmit, receive, or both) data and/or signals using wired and/or wireless communications protocols, for example. Communications unit 389 may communicate signals and/or data between the various elements depicted in FIG. 3D. Communications unit 389 may communicate signals and/or data between the autonomous vehicle 100 and external systems, devices, wireless devices, computing devices, wireless computing devices, data storage devices, communications networks, the Internet, and the Cloud, for example.

In example 350, a sensor unit 136 (e.g., in one of the sensor suites 301a-301d), may include a variety of different sensor types including but not limited to a stereo image capture sensor 359 (e.g., a long range stereo camera), a LIDAR 351 having image capture sensors 353 and 355, another LIDAR 357, another image capture device 361, Sound Navigation And Ranging sensor (SONAR) 375, a RADAR 373, a global positioning system 385 (GPS), and an inertial measurement unit 387 (IMU), for example. There may be multiple SONAR sensors 375 as denoted by 379, for example. The different sensor types may be disposed at different heights (e.g., a distance) within their respective sensor suites 301a-301d, such as heights A-E relative to a reference point 325 on the autonomous vehicle 100 (e.g., a floor structure of bottom of vehicle 100), for example. Heights A-E are non-limiting examples of sensor height and other heights may be implemented among the various sensors in the autonomous vehicle 100.

Each sensor type in the sensor suites 301a-301d may be in communication with one or more autonomous vehicle controllers 136. As one example, each sensor type in the sensor suites 301a-301d may be in communication with three different autonomous vehicle controllers 138 (e.g., positioned in different structural sections 125 or 175 of the vehicle 100) to implement triple redundancy in the processing of sensor output signals from sensors in the sensor suites 301a-301d. There may be more or fewer autonomous vehicle controllers 136 than depicted in example 350 as denoted by 139. The propulsion units 132, steering units 134, and optionally, the breaking units 220 of each structural section (e.g., 125 or 175) may also be in communication with the with three different autonomous vehicle controllers 138. In some examples, the one or more of the sensors in a sensor suit may be aligned with an axis of another sensor in the same sensor suite, such as LIDAR 351 and LIDAR 357, for example. Sensor signals and/or data may be communicated using gigabit Ethernet for sensors including the LIDAR sensors; whereas, gigabit multimedia serial link (GMSL) may be used for the image capture sensors, for example.

Figure 4A:
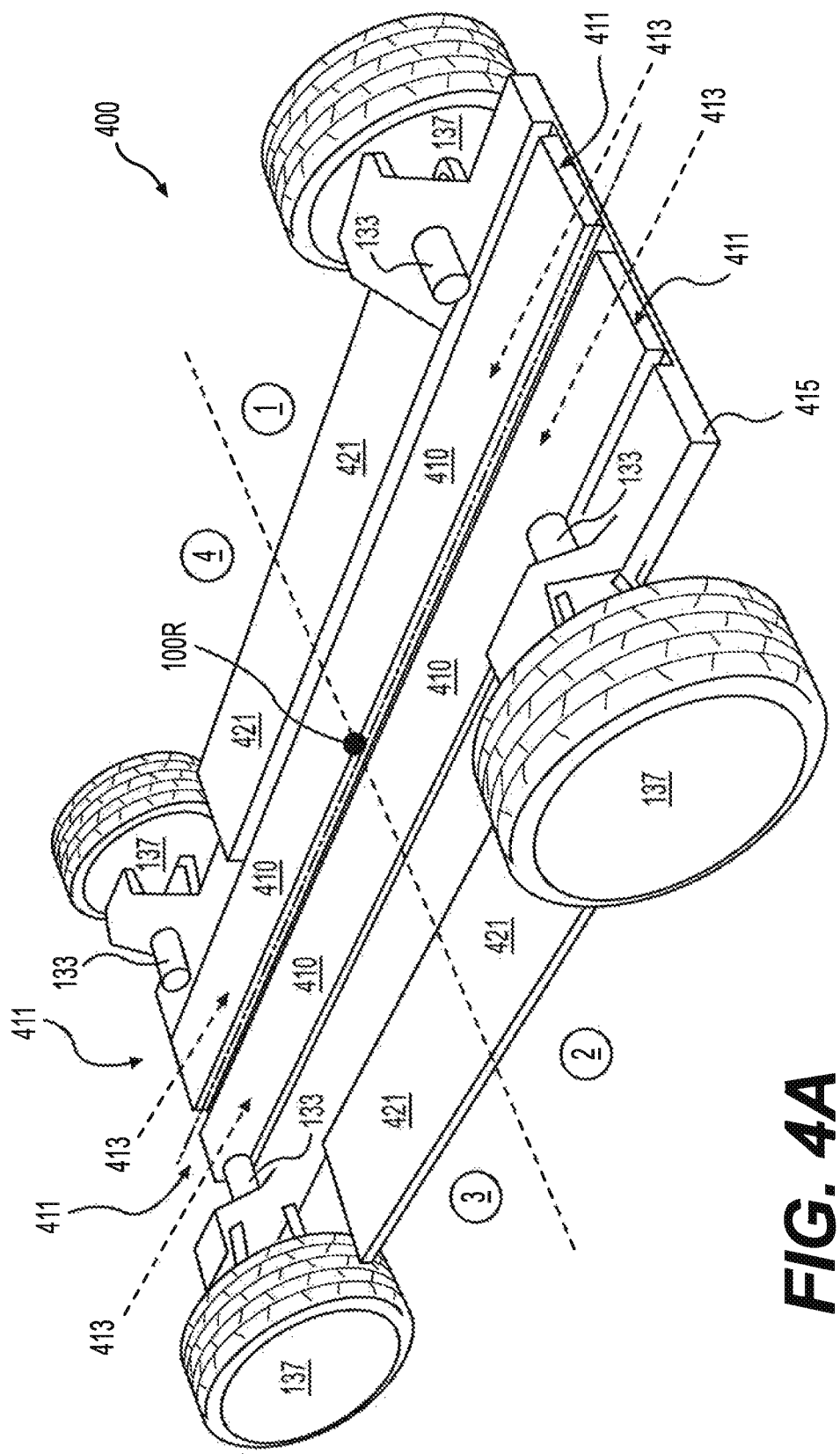
FIG. 4A depicts one example of a vehicle base of an autonomous vehicle.

FIG. 4A depicts one example of a vehicle base 415 of an autonomous vehicle 100. In example 400, each structural section 125 may include a housing 411 being configured to receive a power unit (not shown) (e.g., a rechargeable battery, an enclosure including several rechargeable batteries or cells, a fuel cell, etc.). The power unit may be inserted 413 through an aperture 411 of the housing 410 and secured to the housing 410 using a fastener, glue, an adhesive or the like, for example. Each power unit may be configured to be removable from the housing 410 (e.g., in the opposite direction of arrow 413) for replacement or maintenance, for example. The power units may be symmetrically disposed relative to each other (e.g., relative to point of reference 100r). The symmetrical positioning of the power units relative to one another may provide for dynamic balance of the autonomous vehicle 100 and may provide of a lower center of gravity and/or a lower moment of rotation, for example.

Each power unit may be inset within its respective housing 410 by a distance Oi to position the power unit away from space that may be allocated for a crumple zone of the autonomous vehicle 100, for example. The housing 410 may be coupled with a foundation structure 421 included in each structural section 125. The vehicle base 415 may constitute the structural sections 125 coupled to each other using a suitable technique including but not limited to fasteners, glue, an adhesive, welding, or the like, for example.

Figure 4B:
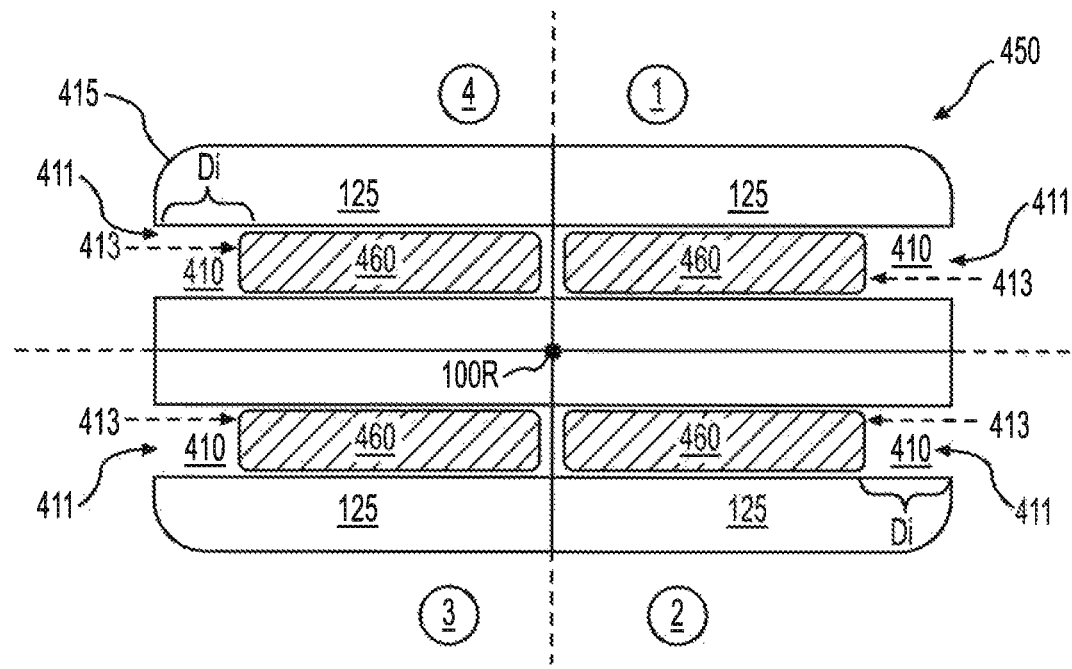
FIG. 4B depicts a top plan view of examples of power units housed in a vehicle base of an autonomous vehicle.
Figure 4B:
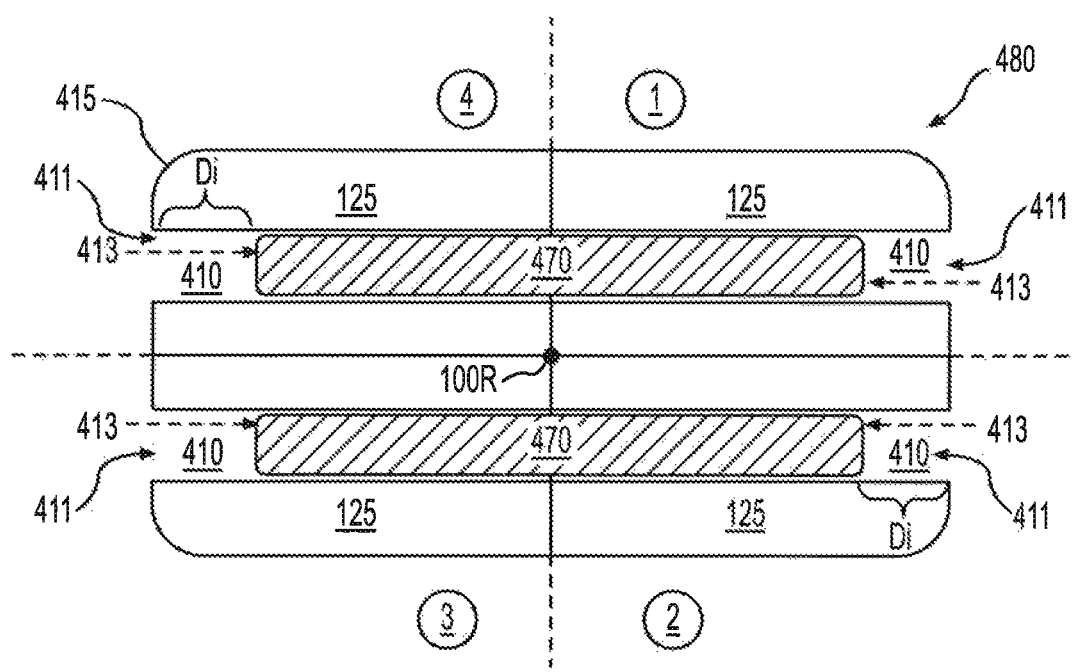

FIG. 4B depicts a top plan view of examples 450 and 480 of power units housed in a vehicle base 415 of an autonomous vehicle 100. In example 450, housings 410 in each structural section 125 may be configured to receive a power unit 460. The power units 460 may be inset in their respective housing 410 by the distance Oi as described above in reference to example 400 of FIG. 4A, for example. Apertures 411 in the housings 410 may be configured to allow the power unit 460 to be inserted 413 into one of the apertures and then advanced deeper into the housing 410, for example.

In example 480, a pair of housings 410 in adjacent structural sections 125 may be configured to receive a power unit 470. The power units 470 may be inset in their respective housing 410 by the distance Oi as described above in reference to example 400 of FIG. 4A, for example. Apertures 411 in the housings 410 may be configured to allow the power unit 470 to be inserted 413 into one of the apertures 411 and then advanced deeper into the housings 410 of the adjacent structural sections 125, for example.

In FIG. 4B, the power units (460, 470) may be electrically coupled with systems of the autonomous vehicle 100 by coupling electrical nodes (not shown) of the power units (460, 470) with electrical nodes (not shown) in one or more of the structural sections 125, for example. Although not depicted in FIGS. 4A-4B, structural sections 175 of FIG. 1 C may be configured to include housings being configured to receive a power unit in a manner similar to that described above in reference to FIGS. 4A-4B. Each power unit (460, 470) may include one or more power sources, such as one or more rechargeable batteries or fuel cells, for example.

Figure 5A:
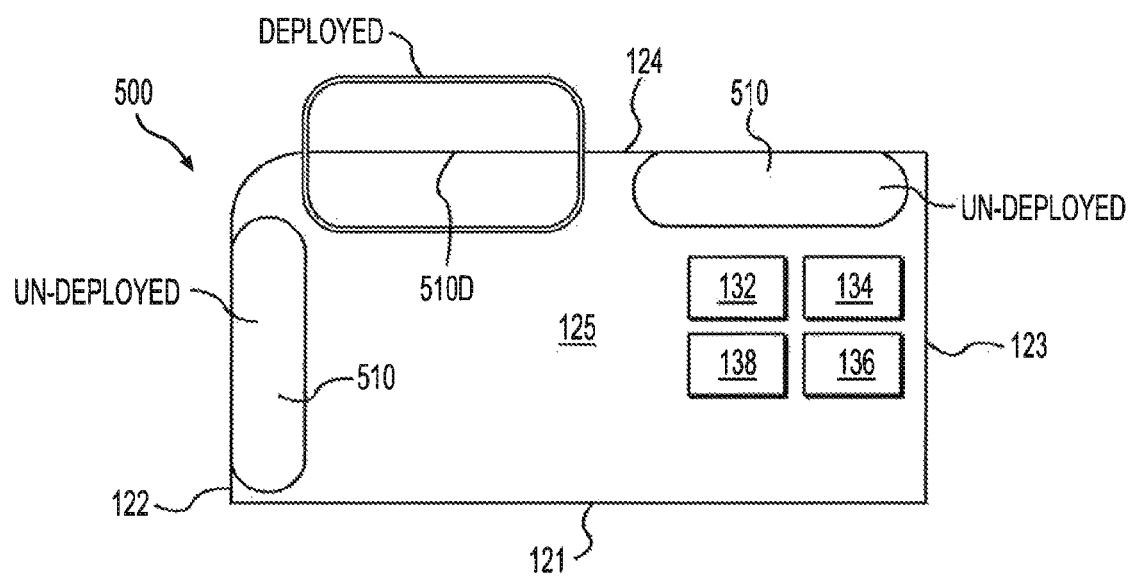
FIG. 5A depicts one example of an external safety system in a structural section of an autonomous vehicle.

FIG. 5A depicts one example 500 of an external safety system in a structural section of an autonomous vehicle 100. In example 500, one or more structural sections 125 may include one or more bladders 510 being configured to expand outward, external of the autonomous vehicle 100, and into the environment to absorb energy from an impact from another vehicle or pedestrian, for example. The bladders 510 may be expanded from an un-deployed position (e.g., 510) to a deployed position 510d. The bladders 510 may be contracted from the deployed position 510d to the un-deployed position 510. In some examples, the bladders 510 may be reused (e.g., if not damaged by an impact).

Figure 5B:
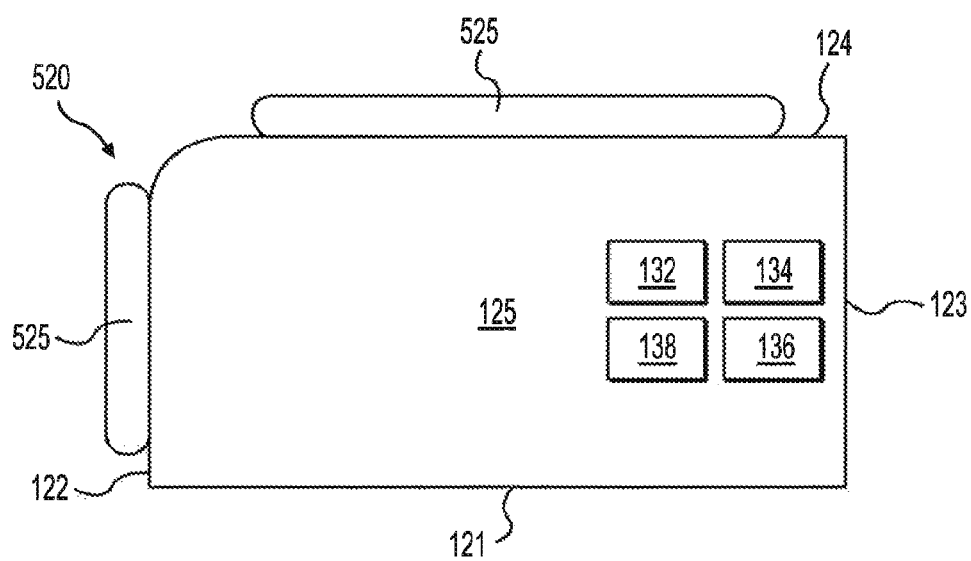
FIG. 5B depicts another example of an external safety system in a structural section of an autonomous vehicle.

FIG. 5B depicts another example 520 of an external safety system in a structural section of an autonomous vehicle 100. In example 520, one or more of the structural sections 125 may include one or more acoustic beam steering arrays 525 being configured to emit a beam of steered acoustic energy at an object external to the autonomous vehicle 100 (e.g., as an acoustic alert to avoid collision or a close pass between the vehicle 100 and an object). The acoustic beam steering arrays 525 may be positioned on the first end of the vehicle 100, the second end of the vehicle 100, both ends of the vehicle 100, and/or on one or more sides of the vehicle 100, for example.

Figure 5C:
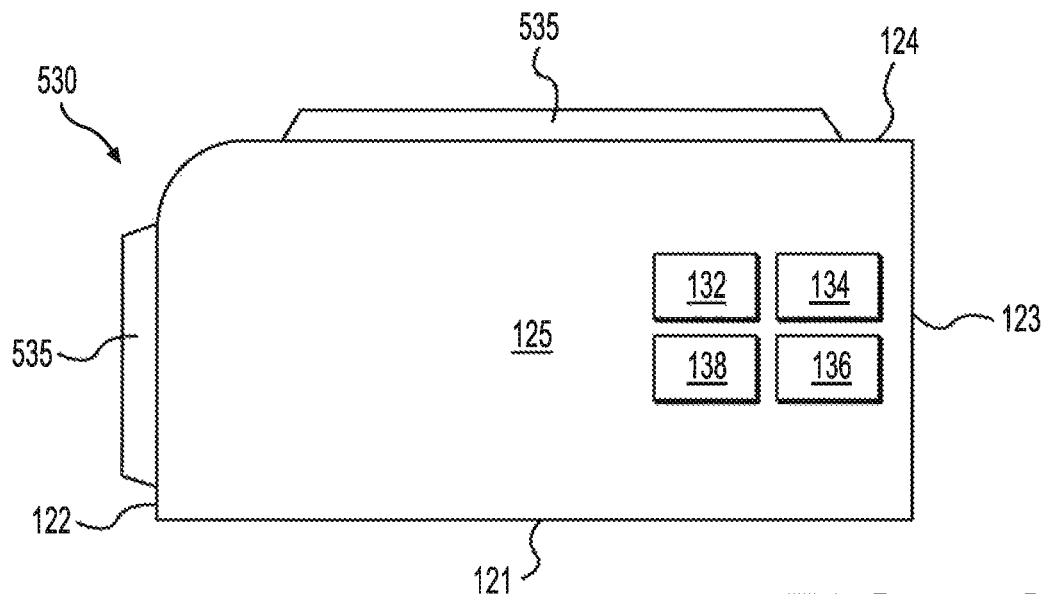
FIG. 5C depicts yet another example of an external safety system in a structural section of an autonomous vehicle.

FIG. 5C depicts yet another example 530 of an external safety system in a structural section of an autonomous vehicle 100. In example 530, one or more of the structural sections 125 may include one or more light emitters 535 being configured to emit light into the environment (e.g., as a visual alert to avoid collision or a close pass between the vehicle 100 and an object). The light emitters 535 may be positioned on the first end of the vehicle 100, the second end of the vehicle 100, both ends of the vehicle 100, and/or on one or more sides of the vehicle 100, for example. In some examples, the light emitters may be used to notify pedestrians and the like of an approach of the autonomous vehicle 100 and/or to visually indicate the autonomous vehicle 100 is slowing down or coming to a stop, for example.

Figure 5D:
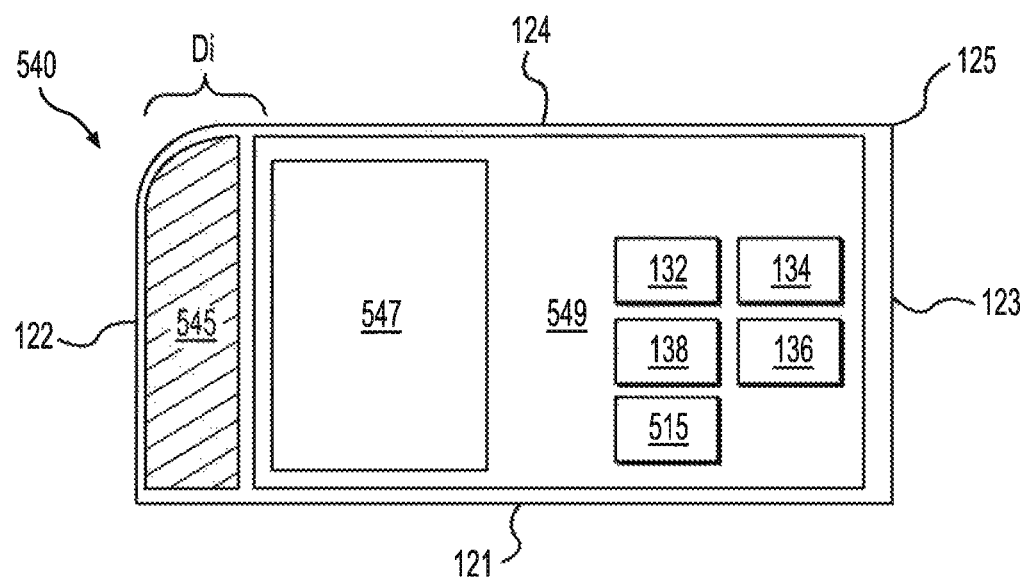
FIG. 5D depicts one example of an interior safety system in a structural section of an autonomous vehicle.

FIG. 5D depicts one example 540 of an interior safety system in a structural section of an autonomous vehicle 100. In example 540, one or more of the structural sections 125 may include a structure for a crumple zone 545 being configured to deform under an impact force to the vehicle 100. As described above in reference to FIGS. 4A-4B, power units (410, 460) and/or other interior structure in the structural sections 125 may be disposed at least at the inset distance Di to provide space for the crumple zone 545 to be located within its respective structural section 125 and/or space to account for intrusion of the crumple zone 545 into an interior of the vehicle 100 as the crumple zone 545 deforms and/or is moved as a result of the impact forces. A safety systems unit 515 may be include in one or more of the structural sections 125. The safety systems unit 515 may be electrically coupled with one or more of the autonomous vehicle controllers 138, for example. The safety systems unit 515 may be configured to monitor and/or activate one or more external safety systems, one or more interior safety systems, or both of the autonomous vehicle 100. In FIG. 5D, the structural section 125 may include a substrate 549 (e.g., a floor or floor pan of the vehicle 100). A structure 547, such as one or more passenger seats or a bench seat may be coupled to the substrate 549, for example. The examples depicted in FIGS. 5A-5D may be implemented in the vehicle 100 having the two structural sections 175, for example.

Figure 6A:
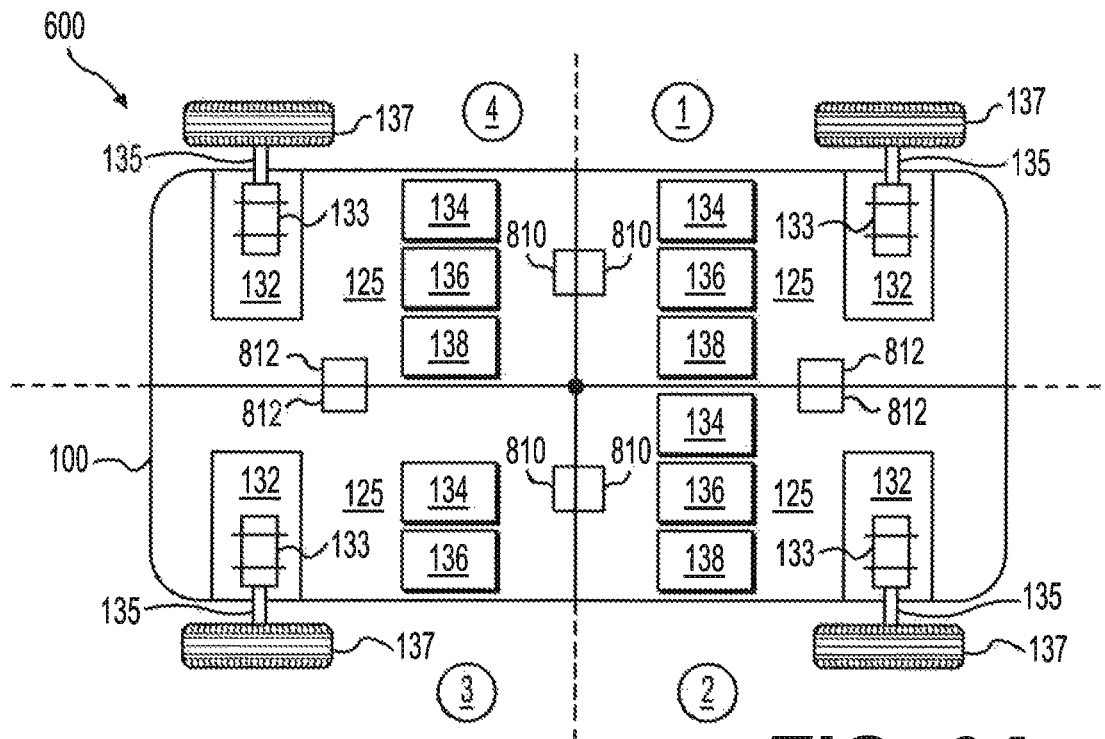
FIG. 6A depicts one example of a coupling between structural sections of an autonomous vehicle.

FIG. 6A depicts one example 600 of a coupling between structural sections of an autonomous vehicle 100. In example 600 one or more couplings 810 and 812 may be implemented to communicate one or more of signals, data, electrical power, or fluids (e.g., compressed gas, hydraulic fluid) between one or more structural sections 125, for example. Couplings 810 and 812 may include electrical connectors and/or fluid couplings being configured to mate with each other when the structural sections 125 are coupled to each other. The structural sections 125 may be aligned with each other (e.g., using machine vision or lasers) to align the couplings 810 and 812 with one another to facilitate mating of the couplings 810 and 812, for example.

Figure 6B:
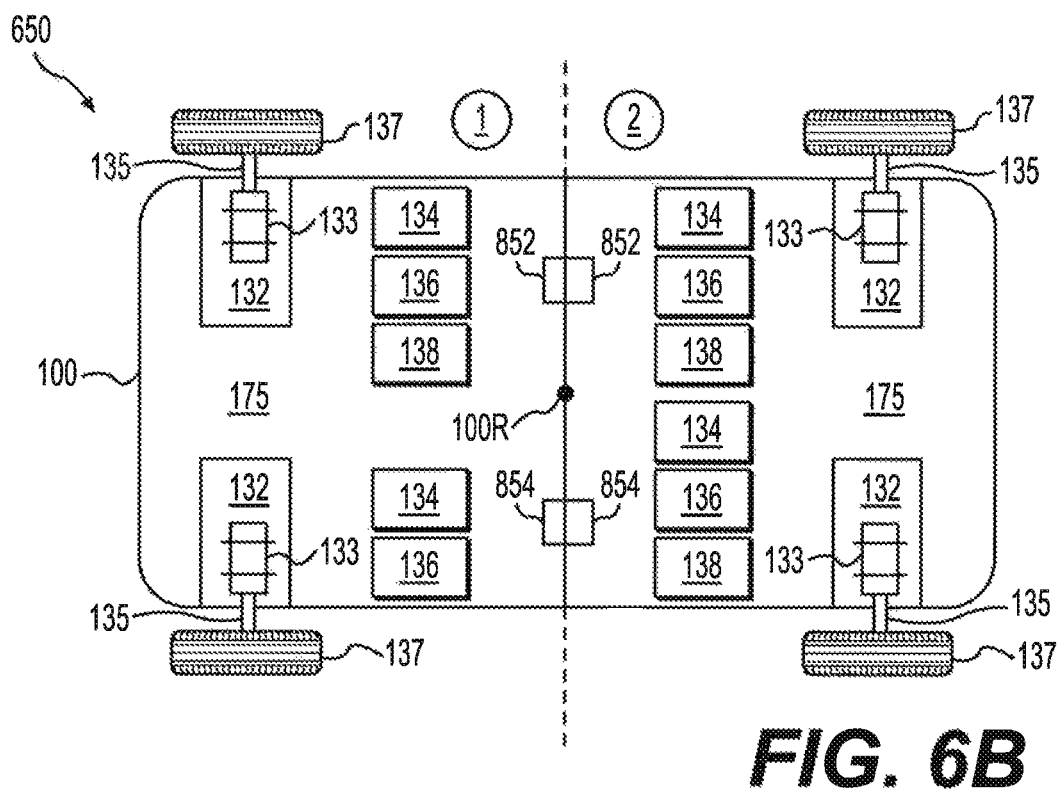
FIG. 6B depicts another example of a coupling between structural sections of an autonomous vehicle.

FIG. 6B depicts another example 650 of a coupling between structural sections of an autonomous vehicle 100. In example 650, structural sections 175 may also include couplings 852 and 854 that may be used to implement communication of one or more of signals, data, electrical power, or fluids (e.g., compressed gas, hydraulic fluid) between structural sections 175, for example.

Figure 7:
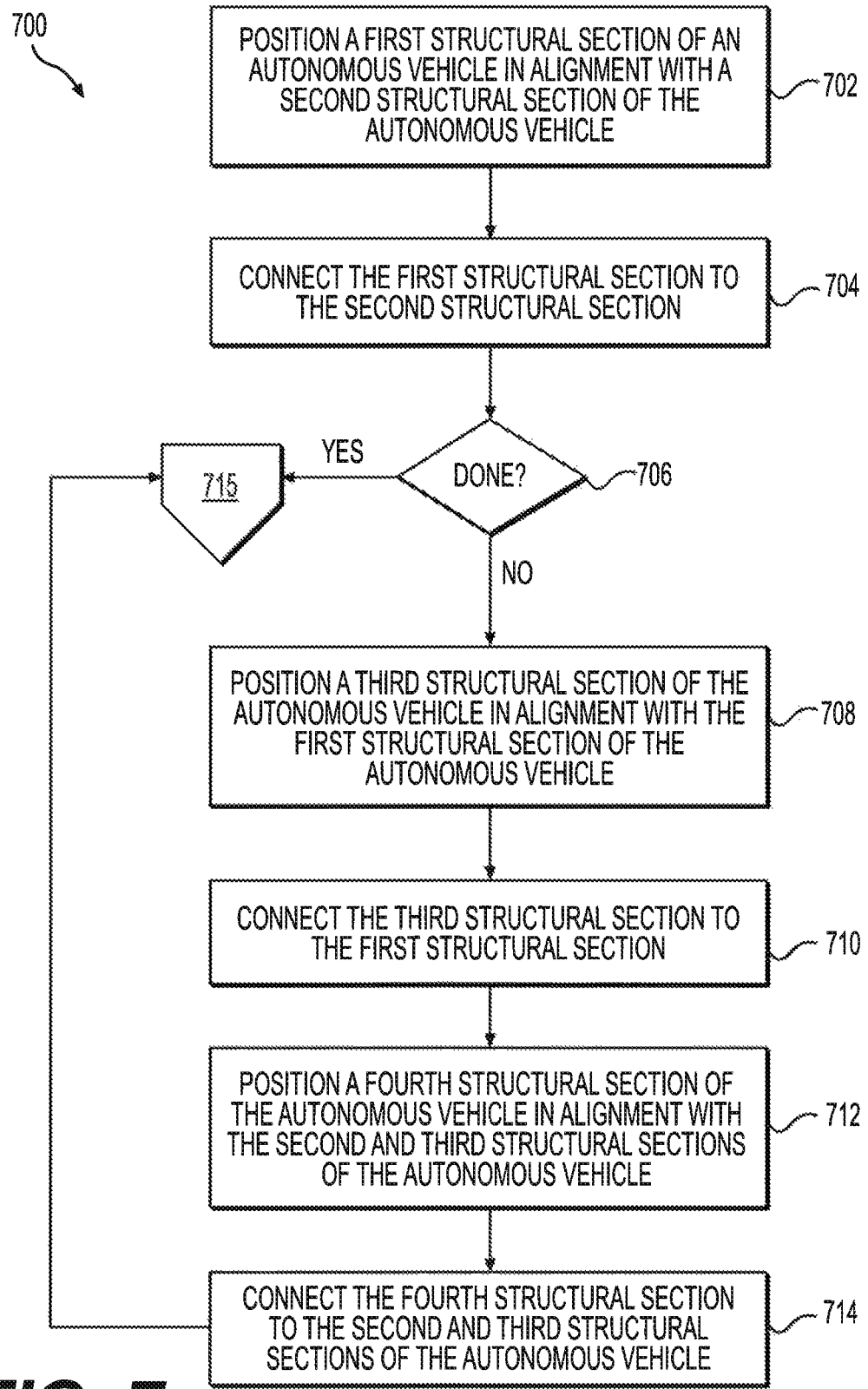
FIG. 7 depicts one example of a flow diagram of a process of assembling structural sections to form an autonomous vehicle.

FIG. 7 depicts one example of a flow diagram 700 of a process of assembling structural sections to form an autonomous vehicle 100. At a stage 702 a first structural section (e.g., 125 or 175) of an autonomous vehicle (e.g., vehicle 100) may be positioned in alignment with a second structural section (e.g., 125 or 175) of an autonomous vehicle. For example, inner surfaces 121 may be positioned in alignment with each other or inner surfaces 123 may be positioned in alignment with each other (see FIG. 1B). As another example, surfaces 173 may be positioned in alignment with each other (see FIG. 1C). At a stage 704, the first structural section may be connected to the second structural section. At a stage 706, a determination may be made as to whether the flow 700 is completed. If a YES branch is taken, the flow 700 may transition to another stage, such as a stage 715, where other processes may be performed on the vehicle 100. As one example, the YES branch may be taken when the first and second structural sections constituted the sections 175 of FIG. 1C. After connecting the first and second structural sections 175, the two halves of the vehicle 100 have been formed and the flow 700 may terminate or transition to another stage (e.g., in another flow), such as the stage 715, for example.

On the other hand, if the NO branch is taken, then the stage 706 may transition to a stage 708, where a third structural section (e.g., 125) may be positioned into alignment with the first structural section (e.g., a previously connected structural section 125).

At a stage 710, the third structural section may be connected to the first structural section. At a stage 712, a fourth structural section (e.g., 125) may be positioned in alignment with the second and third structural sections (e.g., previously connected structural sections 125). At a stage 714, the fourth structural section may be connected to the second and third structural sections. After the stage 714 is completed, the flow 700 may transition to another stage, such as the stage 715 or the flow 700 may terminate, for example. One skilled in the art will appreciate that the order of connection one structural section (e.g., 125, 175) with one or more other structural sections may be varied and is not limited to the order described in reference to flow 700.

Figure 8:
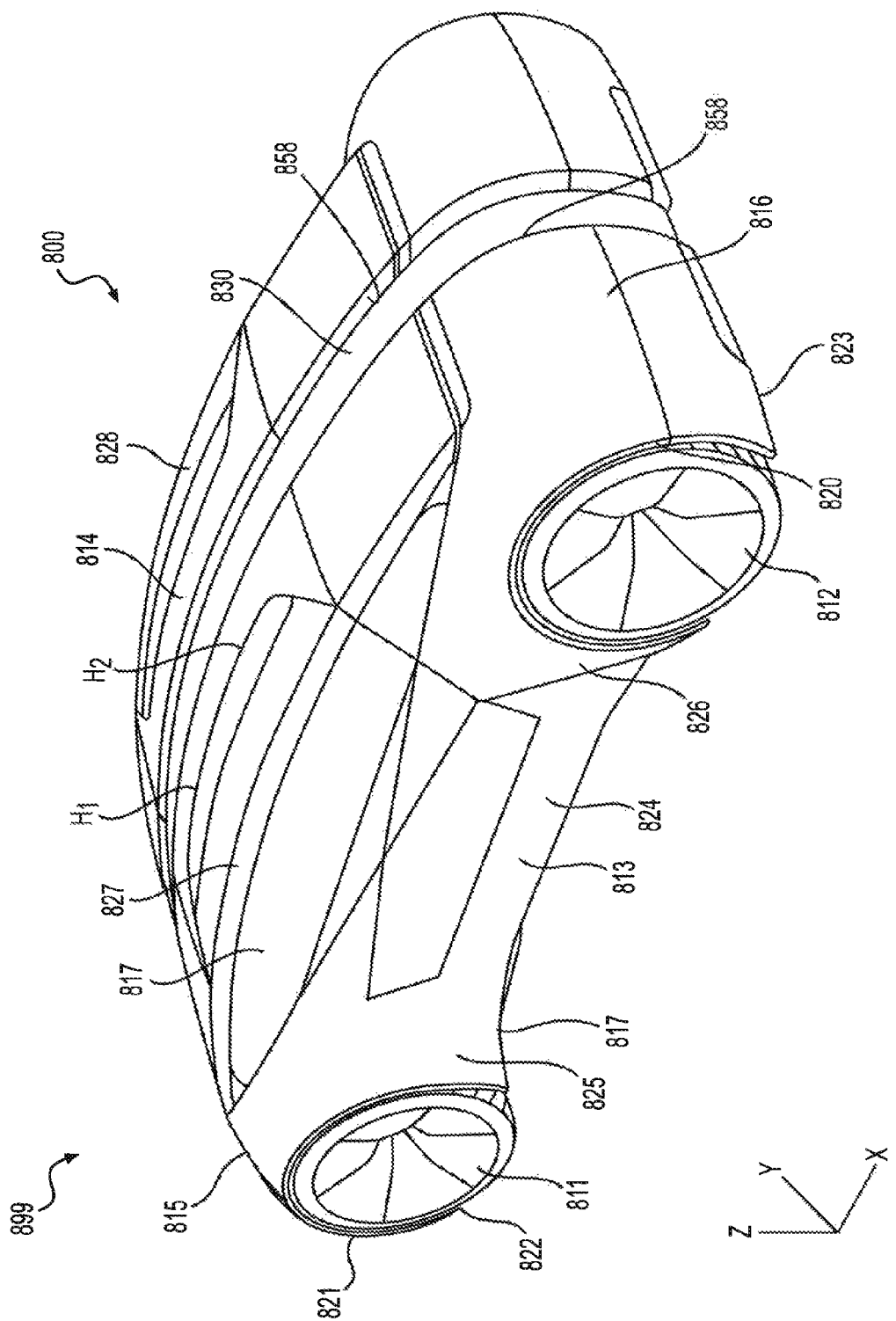
FIG. 8 depicts a perspective view of another example of an autonomous vehicle.

FIG. 8 depicts a perspective view of another example 899 of an autonomous vehicle 800. In example 899, the autonomous vehicle 800 may be formed from four structural sections (e.g., from four quadrant sections). Each structural section may constitute a quadrant of the autonomous vehicle 800, with each quadrant being identical to other quadrants or substantially identical to other quadrants, for example. The autonomous vehicle 800 may include a first pair of wheels 811 (e.g., disposed at a first end) and a second pair of wheels 812 (e.g., disposed at a second end that is opposite the first end). A side panel 813 may extend between the wheels 811 and 812. The autonomous vehicle 800 may include end panels 815 and 816 that may extend laterally across the vehicle 800, for example. A roof panel 814 may extend between a pair of the end panels 815 and 816, for example. One or more transparent openings 817 (e.g., windows, view ports) may extend between the side panel 813 and the roof panel 814, for example. In some examples, the transparent openings 817 may be permanently closed. In other examples, the transparent openings 817 may be opened and closed (e.g., via a window lift coupled to a control switch). The transparent openings 817 may be made from a suitable transparent material including but not limited to glass and plastic, for example.

In some examples, roof paneling 814 may include an arcuate or non-linear profile that may extend between the pairs of wheels 811 and 812, for example. As one example, a radius of curvature of the roof paneling 814 may be about 8.4 meters (e.g., through a major portion of its extent between the pairs of wheels 811 and 812). In other examples, the end panels 815 and 816 may include an arcuate or non-linear profile from a first side edge 820 of panel 816 to a second side edge 821 of panel 815. A radius of curvature of the end panels 815 and 816 may be constant or substantially constant from the first side edge 820 to the second edge 821, for example. A curve of the end panels 815 and 816 may be slightly greater than an outside diameter of the wheels 811 and 812, for example. The end panels 815 and 816 may extend to a position that is towards a bottommost section of the wheels 811 and 812 (e.g., where the wheels 811 and 812 would rest on a ground surface). The end panels 815 and 816 may extend to bottom edges 822 and 823, respectively, of wheels 811 and 812, for example.

The side panel 813 may include a central section 824 and end sections 825 and 826. The end sections 825 and 826 may be integrally formed with the end panels 815 and 816, for example. The end sections 825 and 826 may complete a wheel arch which extends about the wheels 811 and 812, for example. In some examples, the side panel 813 may include a slight inward curve between the wheels 811 and 812. In other examples, the side panel 813 may be planar between the wheels 811 and 812.

The autonomous vehicle 800 may include one or more doors 827. In example 899 of FIG. 8, the door 827 is depicted in a closed position on the vehicle 800. The door 827 may include one or more hinges formed in the roof panel 814 or other suitable structure of the vehicle 800. For example, hinges H1 and H2 may be coupled with the door 827 and the roof panel 814 and may be configured to implement the door 827 opening and closing in a vertical direction, for example. FIG. 8 depicts a top section 828 of a portion of second door 827 disposed on an opposite side of the vehicle 800.

The autonomous vehicle 800 may include a lengthwise recess or cavity 830 that may extend from end panels 815 and 816 to the roof paneling 814. The cavity 830 may be configured to receive a tension member (see tension member 857 of FIG. 11).

The autonomous vehicle 800 may symmetrical about one or more axes, such as the axes X and Y, for example. Symmetry about the one or more axes may be configured to implement bi-directional operation of the vehicle 800. For example, symmetrical configuration of the vehicle 800 may provide for the vehicle 800 being driven with the wheel 811 as the front wheel or with the wheel 812 as the front wheel. As one example, the vehicle 800 need not have a reverse as it may be driven into a parking bay with the end panel 815 being the front of the vehicle 800, and may be driven out of the parking bay with the end panel 816 being the front of the vehicle 800.

A suitable propulsion system may drive the wheels 811 and 812, such as each wheel 811 and each wheel 812 being driven by a dedicated electric motor (e.g., one electric motor per wheel), for example. The electric motors may be controlled by a drive system, and in the event of failure of one electric motor, the drive system may control the remaining three electric motors to continue driving operations of the vehicle 800. The autonomous vehicle 800 may include a four stage level of redundancy in electric motor operation by controlling electric motor operation using redundant computer control systems. Moreover, electric motors may be used for braking purposes, so that separate brakes, and their associated components, weight and complexity, may be potentially be eliminated. Additionally, braking energy may be stored or reused by a regenerative braking system electrically coupled with a power system of the vehicle 800, for example. Other advantages to separately driving each wheel, is that via computer control, anti-lock braking systems and/or electronic stability control systems may be eliminated as those systems may be necessary where a single drive train drives two or more wheels (e.g., via a differential or transaxle).

Figure 9:
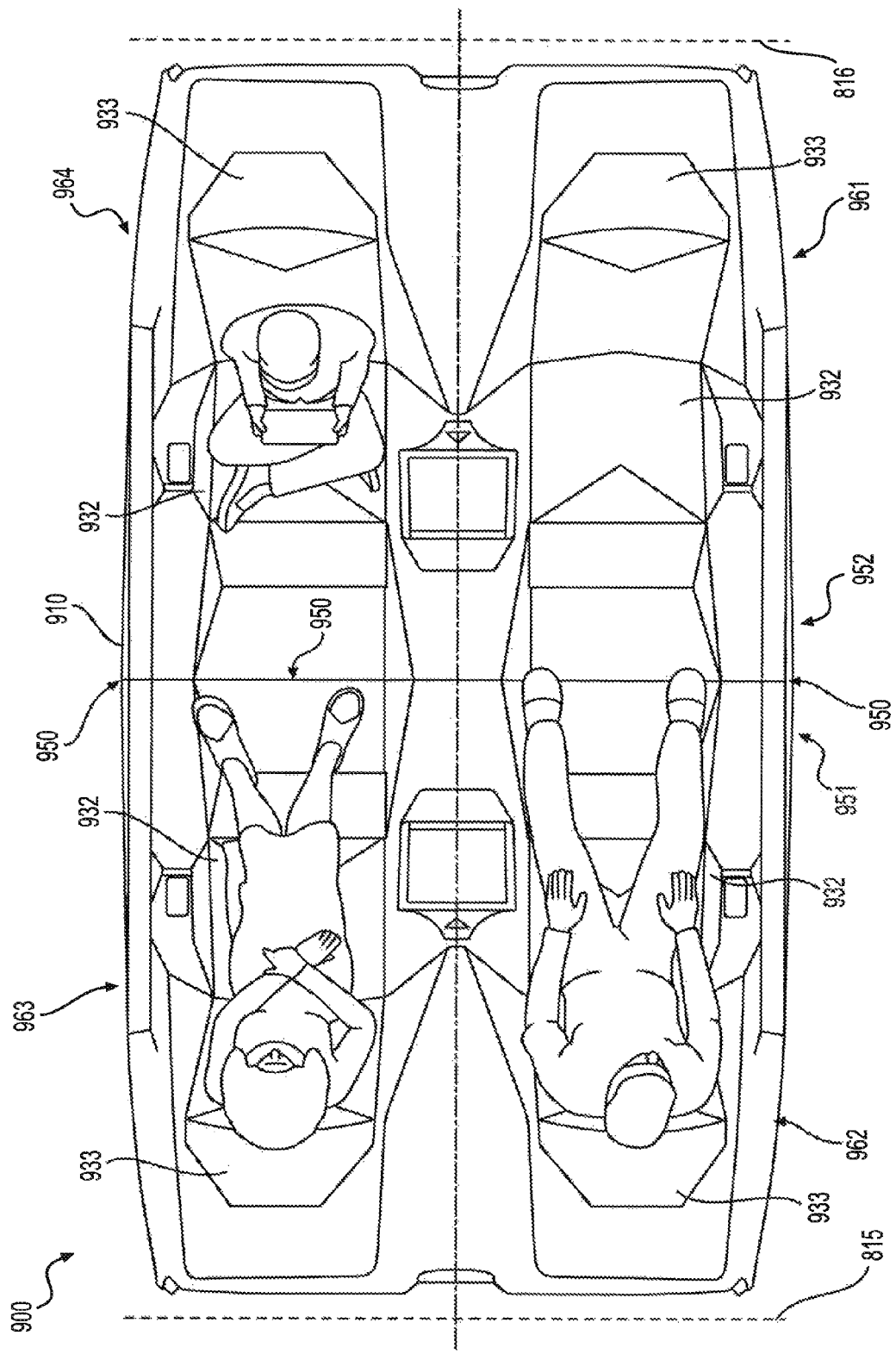
FIG. 9 depicts a plan view of an example of a passenger cabin in an autonomous vehicle.

FIG. 9 depicts a plan view of an example 900 of a passenger cabin 910 in an autonomous vehicle. Passenger cabin 910 may include four seats 932 that may be positioned to face each other as depicted in example 900 of FIG. 9. Other seating configurations may be used (e.g., bench seats, seats facing away from each other, etc.) and more or fewer seats may be include in the passenger cabin 910 and the example 900 is a non-limiting example of a passenger cabin of an autonomous vehicle. The seats 932 may include headrests 933 and the headrests 933 may be positioned proximate the end panels 815 and 816 (depicted in dashed line) of the vehicle 800 as described above in reference to FIG. 8, for example. The passenger cabin 910 may be assembled from multiple structural sections. For example, the passenger cabin 910 may constitute a first structural section 951 and a second structural section 952 and the first and second sections 951 and 952 may be coupled or otherwise joined to each other or some other structure of the vehicle 800 along a common edge 950. In other examples, the passenger cabin 910 may constitute quarter structural sections or quad sections 961-964 (depicted in dashed line) (e.g., four separate sub-units that form the passenger cabin 910). The multiple structural sections (e.g., two separate sections 951 and 952 or four separate sections may be joined prior to being inserted into a quadrant structural section of the vehicle 800 or may be positioned in a quadrant structural section prior to the quadrant structural section being coupled to other quadrant structural sections, for example.

Figure 10:
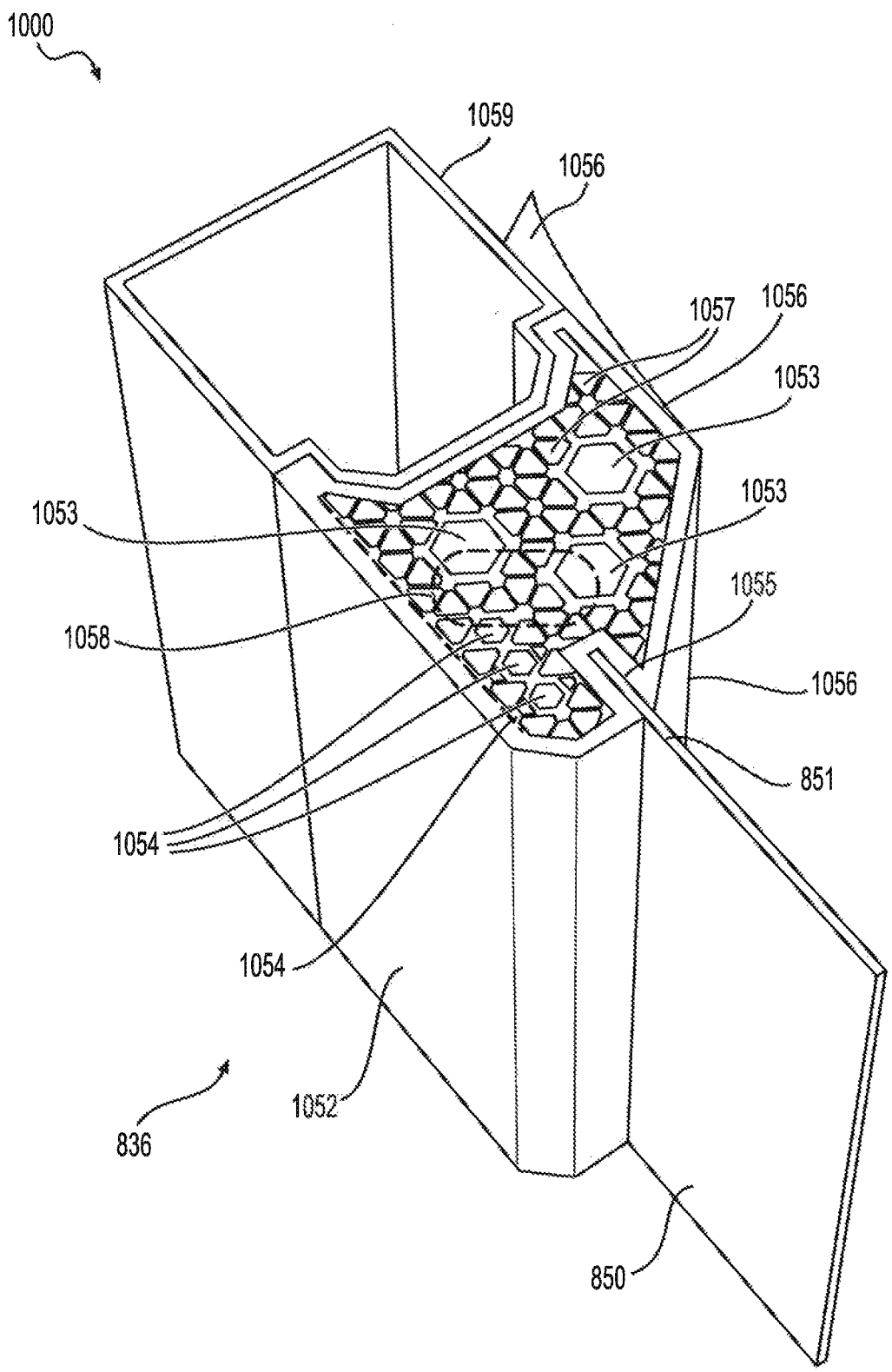
FIG. 10 depicts a cross-sectional view of an example of a frame of an autonomous vehicle.

FIG. 10 depicts a cross-sectional view of an example 1000 of a frame of an autonomous vehicle 800. A frame 836 of the autonomous vehicle 800 may include a core 1059 that may be made from a material including but not limited to a foam insulation, silicone (e.g., a silicone bag), or other materials, for example. The frame 836 may be configured to be modular and may be configured to support various panels of the vehicle 800 (e.g., panels 813, 814, 815 and 816 of FIG. 8), for example.

A frame section 1052 having an interior matrix 1058 may be coupled to the core 1059. The interior matrix 1058 may include a matrix of triangular, circular and hexagonal shapes, which may be configured to provide stiffness and structural support to the frame 836, for example. The interior matrix 1058 may also serve as conduits for routing various fluids, signals, wiring, hoses and the like for vehicle 800.

Hexagonal conduits 1053 may be used to route fluids (e.g., a compressed gas such as nitrogen or other gasses), for example. Circular conduits 1054 may be used to route electrical signals (e.g., via wires, optical cable, local area network cable, etc.) for one or more electrical systems of the vehicle 800, for example. Triangular conduits 1057 may be used to route other structures, tubing, or fluids of the vehicle 800. As one example, hexagonal conduits 1053 may be used to route compressed air to pneumatically operate the opening and closing of doors 827 and/or windows 817 of the vehicle 800.

The frame section 1052 may include a slot 1055 configured to receive an end portion 851 of a stringer 850. The end portion 1051 of the stringer 1050 may be secured in the slot 1055 using glue, a snap connection, an adhesive, a fastener, welding or the like, for example. A fabric skin 1056 may be applied to an exterior surface of the frame section 1052, the core 1059, or both. The fabric skin 1056 may be made from a flexible material, for example. The fabric skin 1056 may be configured to protect underlying structure from exposure to the elements. In some examples, portions of the fabric skin 1056 may be painted, printed, or otherwise marked up to provide an esthetic appearance to the vehicle 800 or for other purposes such as advertising or livery associated with an autonomous vehicle transportation service or business. One or more portions of the fabric skin 1056 may be configured to be removable for servicing or repair of the vehicle 800, to apply a new fabric skin 1056 (e.g., a revised livery or advertisement), or to repair the fabric skin 1056, for example.

Figure 11:
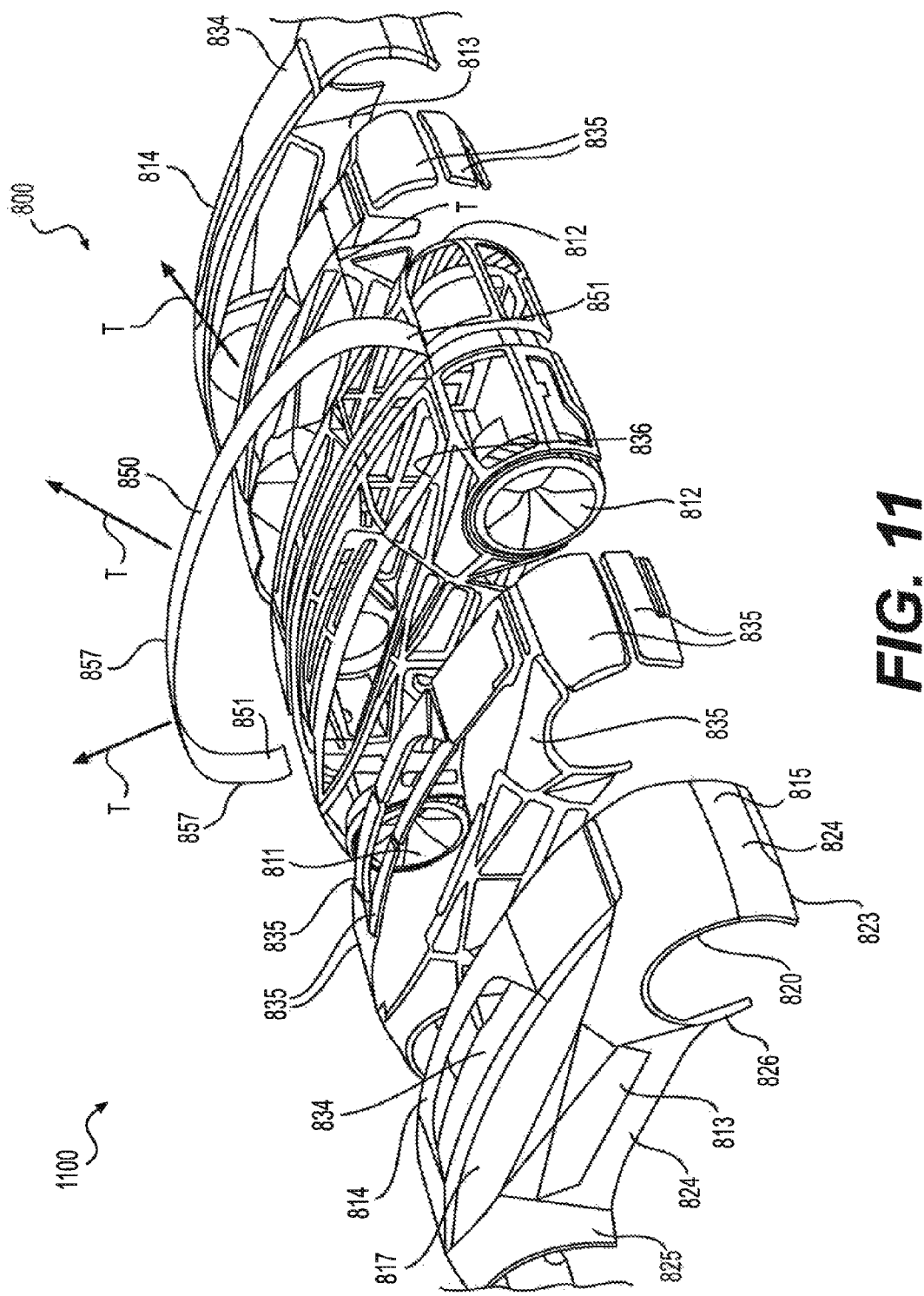
FIG. 11 depicts an example of an exploded view of an autonomous vehicle.

FIG. 11 depicts an example 1100 of an exploded view of an autonomous vehicle 800. The frame section 836 may include voids, channels, slots, grooves, apertures or the like to which one or more insulation panels 835 may be secured (e.g., via glue, an adhesive, a fastener, welding or the like), for example. One or more of the insulation panels 835 may be covered with a fabric 834 (e.g., a stretchable material). The fabric 834 may be stretched about the frame section 836 and over one or more of the insulation panels 835, for example. The insulation panels 835 may include different amounts of insulation material selected for acoustic (e.g., sound attenuating) and/or thermal insulating properties. In some examples, the fabric 834 may be configured to allow for air flow to components of the vehicle 800, such as the drive motors, electronic systems, and break systems. In other examples, the fabric 834 may be configured to shield against electromagnetic interference to systems of the vehicle 800, such as processors and other electrical systems.

The frame section 836 may be configured as a skeleton frame having the interior hollow structure of conduits depicted in FIG. 10 to provide strength and stiffness to the vehicle 800. The interior hollow structure may form the above described conduits for the routing of fluids, wiring, hoses and other infrastructure required by the vehicle 800. The frame structure 836 may extend across the full extent of the vehicle 800 and the routing of the above fluids, wiring, hoses, etc. may be made extensively across the vehicle 800. A secondary frame may be positioned within the frame section 836 and may be configured to support the seats 832 depicted in FIG. 9 and other components of the passenger cabin 910 (e.g., a media console) and may provide additional protection for passengers in the cabin 910 in the event of a collision, for example.

Figure 12:
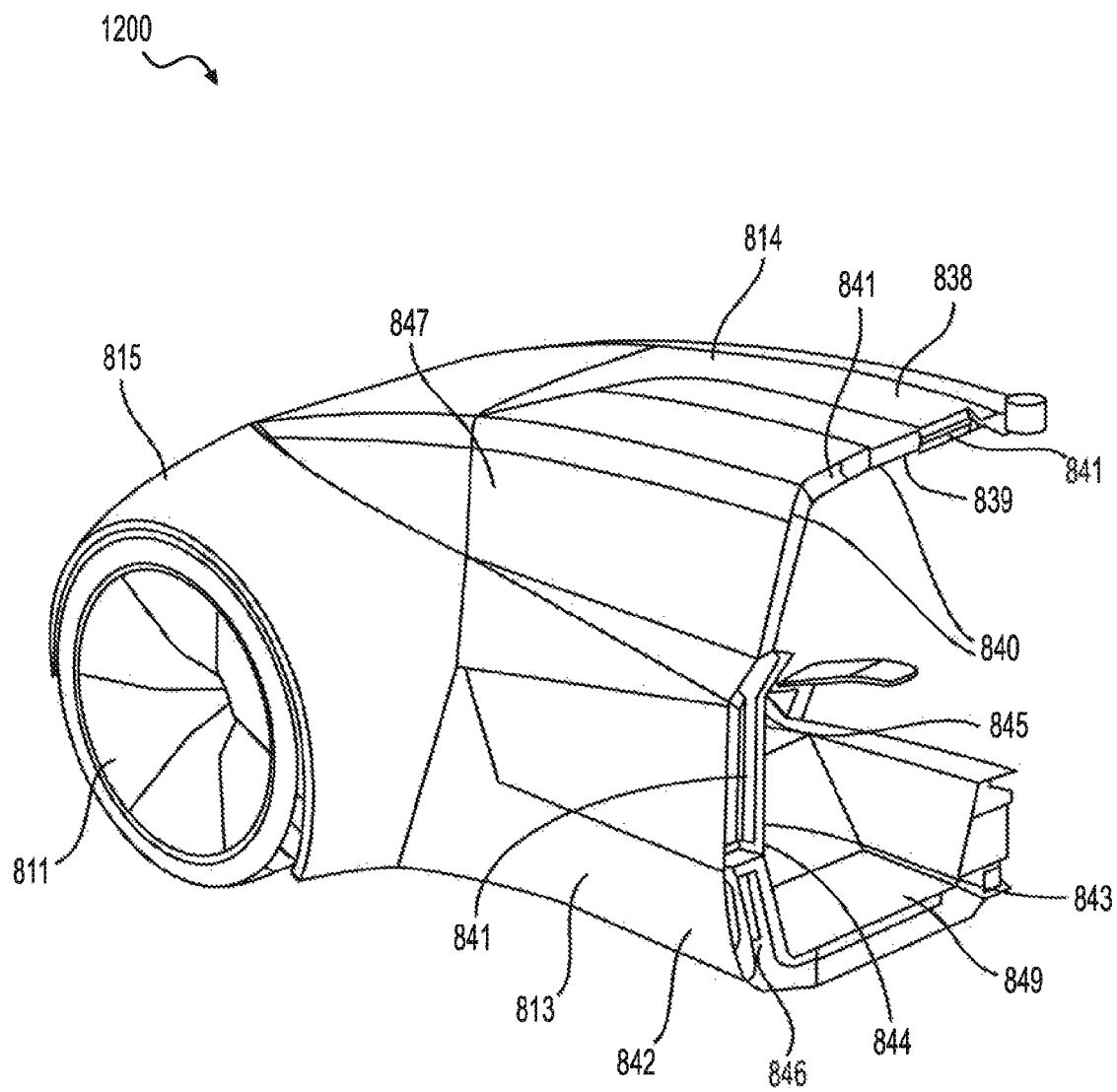
FIG. 12 depicts a view of an example of a quadrant section of an autonomous vehicle.

FIG. 12 depicts a view of an example 1200 of a quadrant section of an autonomous vehicle 800. The autonomous vehicle 800 may be formed from four of the quadrant sections. Each quadrant section may be identical to other quadrant sections. In some examples, one quadrant section may be a mirror image of another quadrant section. In FIG. 12, a quadrant section in assembled form may include end panel 815 and a portion of roof paneling 814. The roof paneling 814 may include an upper fabric skin portion 838 and a lower fabric skin portion 839 that may extend about frame sections 840, and insulation 841 may be accommodated within voids created by the fabric skin portions 838 and 839, for example. Side panel 813 may be constructed in a manner similar to that of the roof paneling 814. Fabric skin portions 842 and 843 may extend about frame sections 844 and 845 and insulation 846 may be accommodated within voids created by the fabric skin portions 842 and 843, for example. A quadrant section may be coupled to other quadrant sections using glue, a snap connection, a weld, an adhesive, a fastener, fusion or the like, for example.

Figure 13:
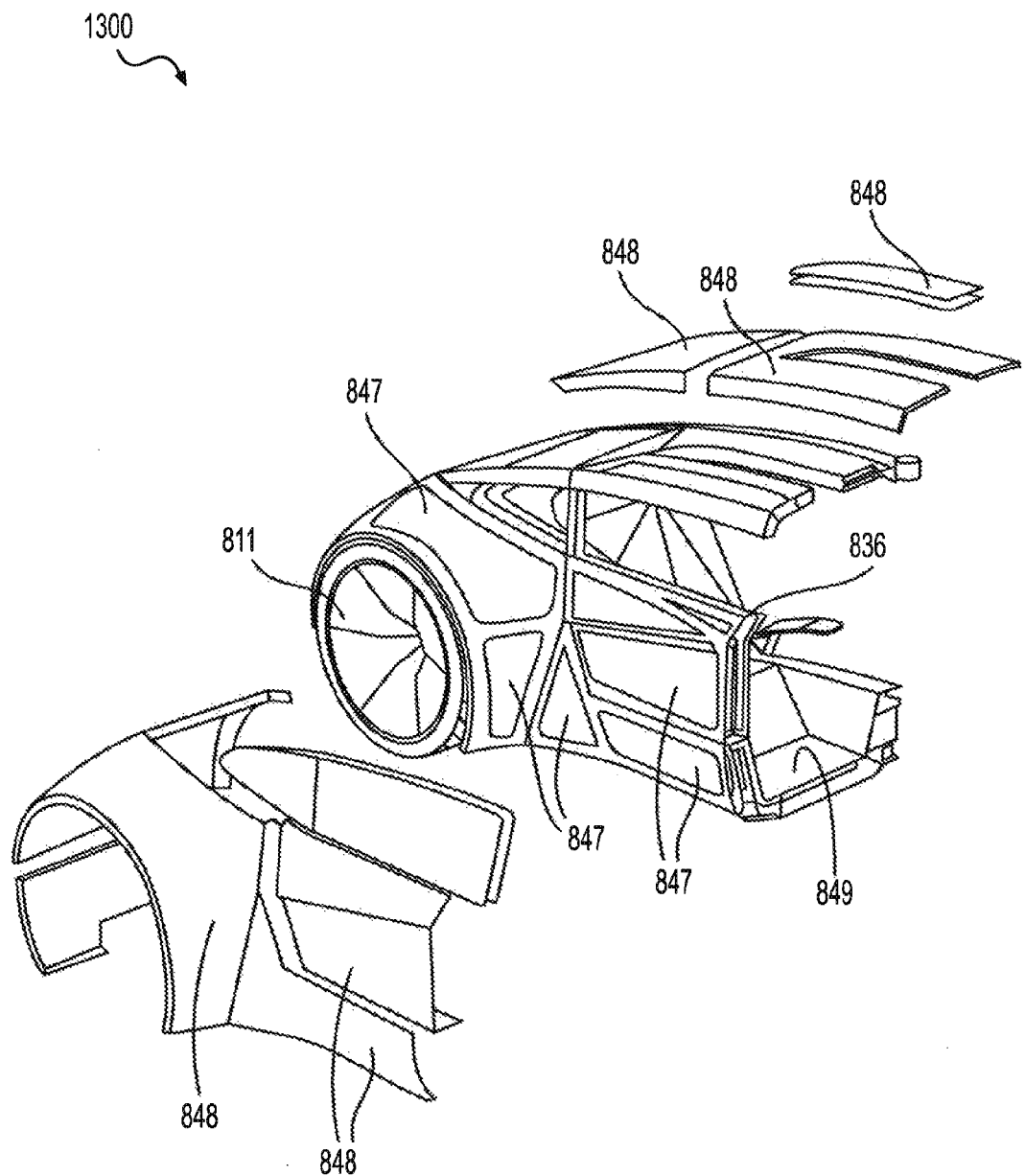
FIG. 13 depicts an example of an exploded view of a quadrant section of an autonomous vehicle.

FIG. 13 depicts an example 1300 of an exploded view of a quadrant section of an autonomous vehicle 800. In example 1300, various insulation panels 847 may be inserted within voids of the frame structure 836. One or more fabric sections 848 may be extended about the frame structure 836 to enclose the insulation panels 847. Each section or quadrant of the vehicle 800 may include a floor base 849 on which the seats 832 (see FIG. 9) may be mounted. The floor base 849 may form part of a vehicle base which may be formed from four parts or sections. Each section or quadrant of the vehicle 800 may include one of the seats 832, a wheel (e.g., 811 or 812), a portion of a side panel 813, a portion of an end panel (e.g., 815 or 816), and a portion of a roof paneling 814, for example. The examples of FIGS. 12 and 13 may constitute one of the sections or quadrants of the vehicle 800. A second quadrant or section may be identical to the quadrant depicted in FIGS. 12 and 13 and two additional quadrants or sections may be mirror images of the quadrant depicted in FIGS. 12 and 13, for example. Each quadrant or section may include a drive motor coupled with the wheel of the quadrant, suitable wiring, pneumatic connections, and other components of the vehicle 800, for example.

Further to FIG. 11, a flexible tension member 850 (e.g., a stringer) is depicted elevated above the recess 830 (see FIG. 8). The flexible tension member 850 may be configured to fit (e.g., edges 857 may neatly fit within recess 830) within the recess 830 and to connect with the frame 836 to maintain the frame 836 in tension T. For example, a natural bias force of the flexible tension member 850 may be in a direction denoted by arrows for tension T. Distal ends of the flexible tension member 850 may be secured to suitable locations on the vehicle 800 (e.g., slot 1055 in frame section 1052 of FIG. 10) to apply a constant tension to the frame 836. Flexible tension member 850 may be configured to provide structural support to frame 836 while minimizing weight and providing impact protection from potential collisions. The flexible tension member 850 may be made from a material including but not limited to plastics, flexible or resilient metals, composites, fiberglass, and carbon fiber, for example.

Figure 14:
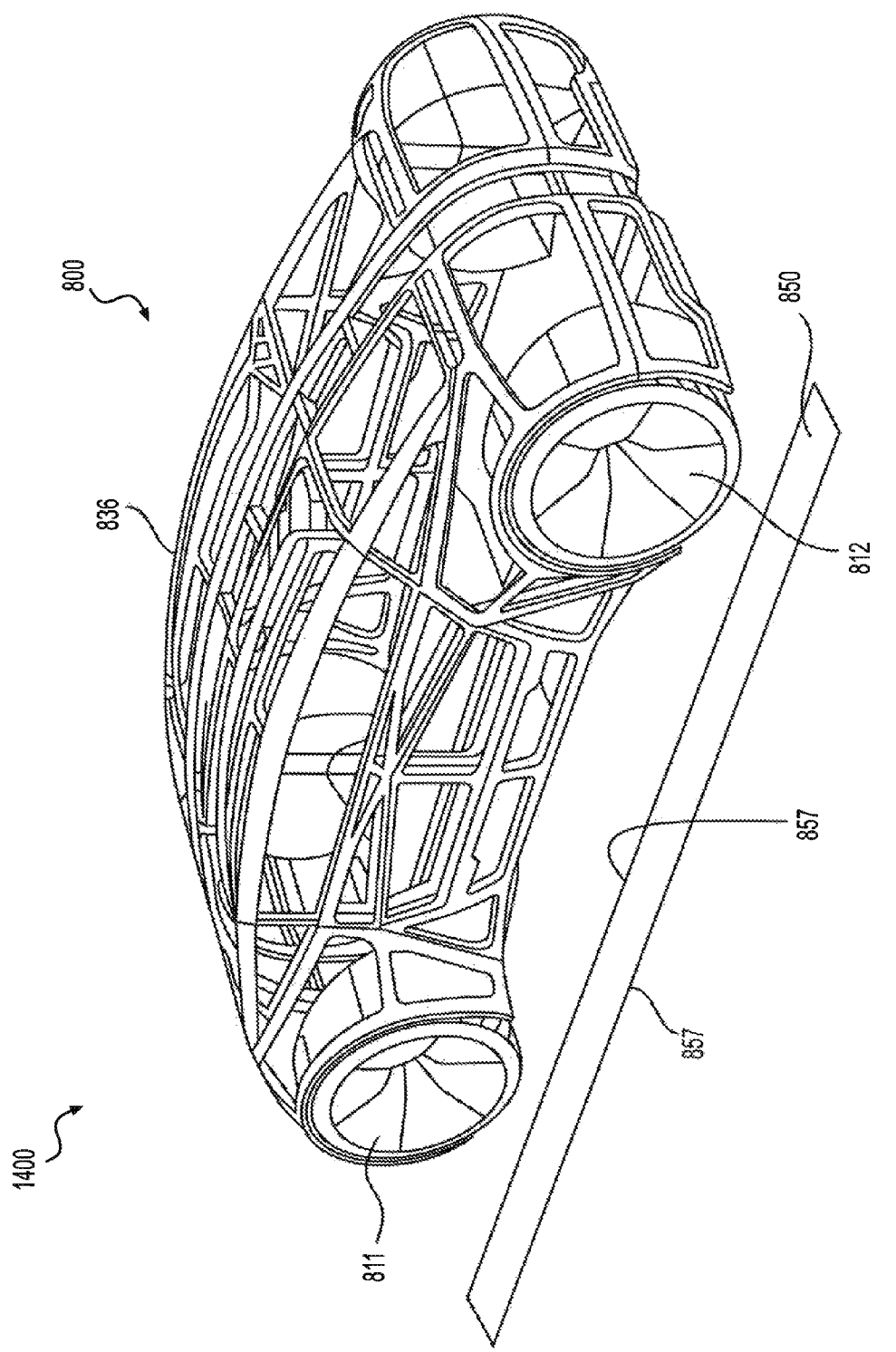
FIG. 14 depicts a perspective view of an example of frame construction of an autonomous vehicle.

FIG. 14 depicts a perspective view of an example 1400 of frame construction of an autonomous vehicle 800. In FIG. 14, the frame 836 may be formed from the quadrant sections depicted in FIGS. 12 and 13.

Figure 15:
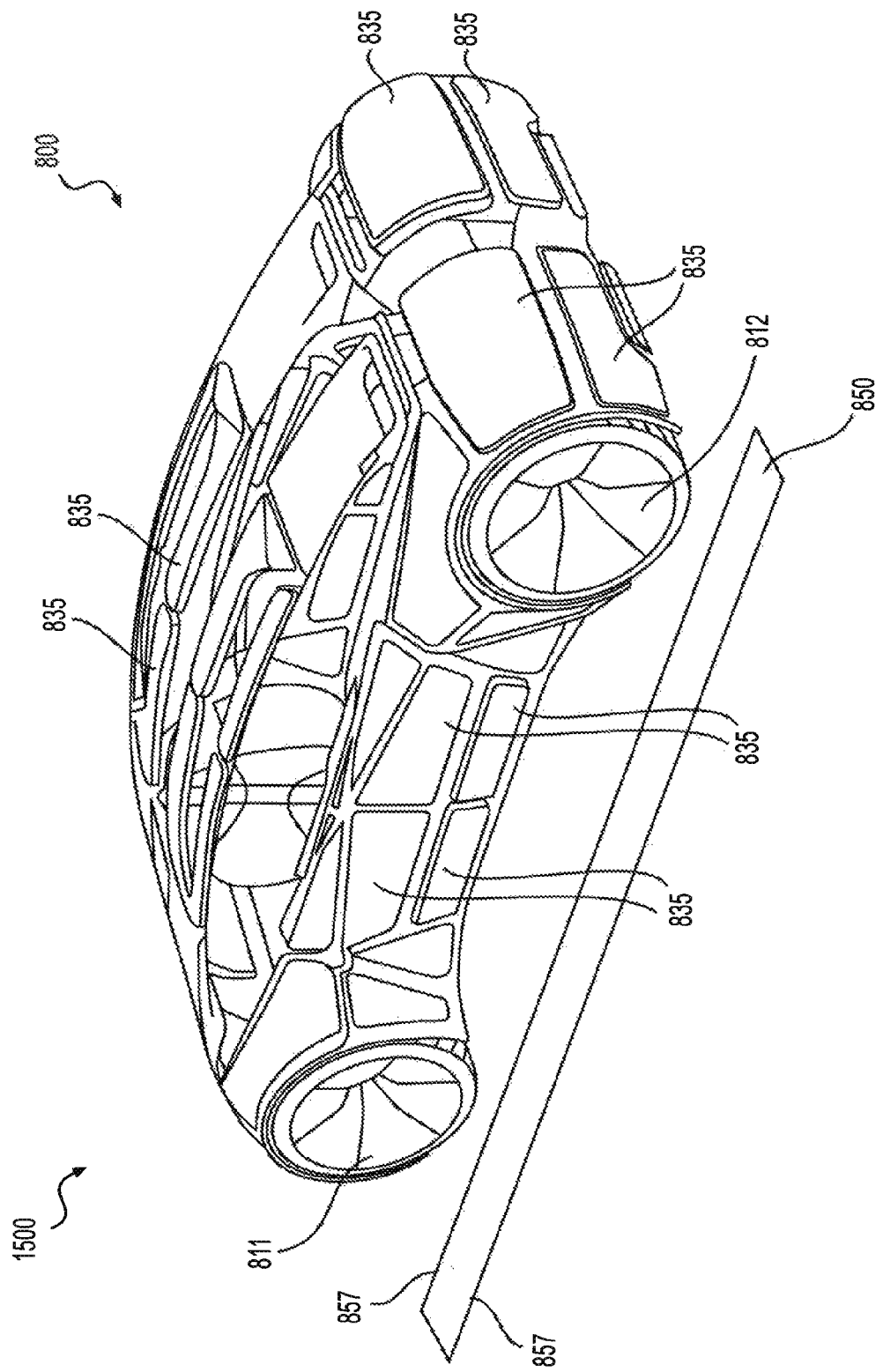
FIG. 15 depicts a perspective view of an example of insulation construction of an autonomous vehicle.

FIG. 15 depicts a perspective view of an example 1500 of insulation construction of an autonomous vehicle 800. In FIG. 15, insulation panels 835 may be coupled with one or more sections of the frame 836 depicted in FIG. 14. The insulation panels 835 may be covered with a fabric skin and the fabric skin may be made from a flexible material, for example.

FIG. 16 depicts a perspective view of an example 1600 of a floor base of an autonomous vehicle 800. In example 1600, the floor base 849 is depicted in fully assemble configuration; however, the floor base 849 may constitute a quarter section of a quadrant of the vehicle 800. In FIG. 16, the quarter sections of the floor base 849 are denoted as 849a, 849b, 849c and 849d. The quarter sections 849a-849d of the floor base 849 may be coupled to one another using glue, a snap connection, a weld, an adhesive, a fastener, fusion or the like, for example. The floor base 849 may include mounting points 1631 configured to receive other structure of the vehicle 800, such as the seats 832, for example. Structure other than the seats 832 may be mounted or coupled to the mounting points 1631. The floor base 849 may include an enclosure 1620 in which electronic systems, processors, and other systems, wiring, cabling, conduits and other structure may be positioned. Components of the passenger cabin 910 may be mounted to and/or supported by the enclosure 1620. Channels 1621 and 1623 may be used to route structure to/from the enclosure 1620. The floor base 849 may include an aperture 1601 through which a power supply 1610 (e.g., a rechargeable battery(s) or fuel cell(s)) may be inserted into the floor base 849. Electrical nodes 1612 and 1614 of the power supply 1610 (e.g., terminals of a rechargeable battery) may be coupled with appropriate systems of the vehicle that require electrical power.

In example 1650 of FIG. 16, the electrical nodes 1612 and/or 1614 may be electrically coupled with a switch 1651. The switch 1651 may be configured to be manually actuated 1652 by pressing or otherwise actuating a button 1653 of the switch 1651. In some examples, the switch 1651 may be electronically actuated via a signal 1659. The signal 1659 may be generated by a system of the autonomous vehicle 800 upon detection of an event, such as a collision (e.g., detected by a motion sensor), for example. Actuation of the switch 1651 (e.g., manually and/or electronically) may be configured to kill (e.g., defeat or disconnect) electrical power from the power supply 1610 to a power controller 1655 of the autonomous vehicle 800. The switch 1651 may be electrically coupled (1652, 1654) with the power controller 1655. The power controller 1655 may be configured to distribute electrical power to one or more systems of the autonomous vehicle 800, for example. Switch 1651 may be used as an emergency power kill switch that may be actuated by an emergency responder or other person in the event of a collision, accident, or other situation that may necessitate intentionally disabling the autonomous vehicle 800 in the interest of safety of its passengers or other persons. Switch 1651 may be positioned at one or more locations on the autonomous vehicle 800, such as at a location proximate the end panels 815 and 816, for example. The switch 1651 may be positioned behind a protective cover, door or plate that may be opened to gain physical access to the button 1653 of the switch 1651, for example.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. An apparatus, comprising:
a first structural section including a first propulsion unit, a first steering unit and a first sensor unit;
a second structural section including a second propulsion unit, a second steering unit and a second sensor unit; and
one or more autonomous vehicle controllers electronically coupled with one or more of the first propulsion unit, the second propulsion unit, the first steering unit, the second steering unit, the first sensor unit, or the second sensor unit.

2. The apparatus of claim 1, further comprising one or more bases, the one or more bases coupled to the first structural section and the second structural section, wherein the base includes one or more power units, the one or more power units coupled to one or more of the first propulsion unit, the second propulsion unit, the first steering unit, the second steering unit, the first sensor unit, or the second sensor unit.

3. The apparatus of claim 2, wherein the one or more bases includes a first base coupled to the first structural section and a second base coupled to the second structural section, wherein the first base is coupled to the second base.

4. The apparatus of claim 1, further comprising one or more housings coupled to the base, wherein individual ones of one or more housings are configured to receive at least one of the one or more power units.

5. The apparatus of claim 1, wherein the one or more housings include a first housing and a second housing, the first housing positioned symmetrically from the second housing.

6. The apparatus of claim 1, wherein the first structural section comprises a first frame section, wherein at least a portion of the first frame section is covered, at least partially, by a fabric skin.

7. The apparatus of claim 6, further comprising one or more insulation panels coupled to the first frame section, wherein at least a portion of one of the insulation panels is covered, at least partially, by at least a portion of the fabric skin.

8. The apparatus of claim 6, further comprising a first crumple zone configured to deform under an impact force and a second crumple zone configured to deform under the impact force, wherein the first structural section includes a first space for the first crumple zone and the second structural section includes a second space for the second crumple zone.

9. The apparatus of claim 1, wherein the one or more vehicle controllers includes a first vehicle controller disposed within the first structural section, and a second vehicle controller disposed in the second structural section.

10. The apparatus of claim 9, further comprising a first sensor suite and a second sensor suite, wherein the first sensor suite is coupled to the first vehicle controller and the second vehicle controller and the second sensor suite is coupled to the first vehicle controller and the second vehicle controller.

11. The apparatus of claim 1, further comprising first light emitters and second light emitters, wherein the first light emitters are coupled to the first structural section and the second light emitters are coupled to the second structural section.

12. The apparatus of claim 1, further comprising a first acoustic emitter and a second acoustic emitter, wherein the first acoustic emitter is coupled to the first structural section and the second acoustic emitter is coupled to the second structural section.

13. A system, comprising:
a first wheel and a second wheel;
a first structural section of a robotic vehicle coupled to the first wheel, wherein the first structural section includes a first frame section and a first propulsion unit configured to propel the robotic vehicle;
a second structural section of the robotic vehicle coupled to the second wheel, wherein the second structural section includes a second frame section and a second propulsion unit configured to propel the robotic vehicle, wherein the second structural section is coupled to the first structural section; and
one or more robotic vehicle controllers coupled to the first structural section and the second structural section.

14. The system of claim 13, wherein the first structural section further comprises:
a first steering unit configured to steer the first wheel;
a first sensor unit configured to sense an environment external to the robotic vehicle; and
a first robotic vehicle controller of the one or more robotic vehicle controllers, wherein the first robotic vehicle controller is electronically coupled with one or more of the first propulsion unit, the first steering unit, or the first sensor unit.

15. The system of claim 13, further comprising one or more bases coupled to the first structural section and the second structural section, wherein at least one of the one or more bases includes a power unit coupled to one or more of the first propulsion unit, the first steering unit, or the first sensor unit.

16. The system of claim 15, wherein the one or more bases includes a first base coupled to the first structural section and a second base coupled to the second structural section, wherein the first base is coupled to the second base.

17. The system of claim 15, further comprising one or more housings coupled to at least one of the one or more bases, wherein individual ones of one or more housings are configured to receive a power unit.

18. The system of claim 13, wherein at least a portion of the first frame section is covered, at least partially, by a fabric skin.

19. The system of claim 18, further comprising one or more insulation panels coupled to the first frame section, wherein at least a portion of one of the insulation panels is covered, at least partially, by at least a portion of the fabric skin.

20. The system of claim 13, wherein the first structural section further comprises a first crumple zone configured to deform under an impact force and wherein the second structural section further comprises a second crumple zone configured to deform under the impact force, wherein the first structural section includes a first space for the first crumple zone and the second structural section includes a second space for the second crumple zone.

21. The system of claim 13, wherein the first structural section further comprises a first sensor suite and wherein the second structural section further comprises a second sensor suite, wherein the first sensor suite and the second sensor suite are coupled to the at least one of the one or more robotic vehicle controllers.

22. The system of claim 13, further comprising first light emitters and second light emitters, wherein the first light emitters are coupled to the first structural section and the second light emitters are coupled to the second structural section.

23. The system of claim 13, further comprising a first acoustic beam steering array configured to emit a first beam of steered acoustic energy and a second acoustic beam steering array configured to emit a second beam of steered acoustic energy, wherein the first acoustic beam steering array is coupled to the first structural section and the second acoustic beam steering array is coupled to the second structural section.

24. A robotic vehicle comprising:
a first structural section of the robotic vehicle comprising:
a first exterior surface; and
a first light emitter disposed on the first exterior surface;
a second structural section of the robotic vehicle comprising:
a second exterior surface of the second structural section; and
a second light emitter disposed on the second exterior surface; and
one or more robotic vehicle controllers communicatively coupled to the first structural section and the second structural section and configured to control the first light emitter and the second light emitter to emit light to identify a direction of travel of the robotic vehicle.

25. The robotic vehicle of claim 24, further comprising:
a third structural section of the robotic vehicle comprising:
a third exterior surface; and
a third light emitter disposed on the third exterior surface;
a fourth structural section of the robotic vehicle comprising:
a fourth exterior surface of the fourth structural section; and
a fourth light emitter disposed on the fourth exterior surface,
wherein one or more robotic vehicle controllers are communicatively to the third structural section and the fourth structural section to control the third light emitter and the fourth light emitter to identify the direction of travel of the robotic vehicle.

26. The robotic vehicle of claim 25, wherein:
the first structural section and the second structural section are symmetric with the third structural section and the fourth structural section, respectively, about a first axis; and
the first structural section and the third structural section are symmetric with the second structural section and the fourth structural section, respectively, about a second axis perpendicular to the first axis.

27. The robotic vehicle of claim 24, further comprising a first acoustic beam steering array configured to emit a first beam of steered acoustic energy and a second acoustic beam steering array configured to emit a second beam of steered acoustic energy, wherein the first acoustic beam steering array is coupled to the first structural section and the second acoustic beam steering array is coupled to the second structural section.

28. The robotic vehicle of claim 24, wherein at least a portion of each of the first exterior surface and the second exterior surface comprises a fabric skin.

29. The robotic vehicle of claim 24, wherein:
at least one of the first structural section or the second structural section comprises a sensor suite coupled to the one or more robotic vehicle controllers to sense objects in an environment of the robotic vehicle, and
the one or more robotic vehicle controllers are further configured to control the first light emitter and the second light emitter to emit light based at least in part on an object detected by the sensor suite.

* * * * *